United States Patent
Hamada et al.

(10) Patent No.: US 10,243,360 B2
(45) Date of Patent: Mar. 26, 2019

(54) POWER SUPPLY APPARATUS FOR SETTING TARGET TIMES OF CONTROL SIGNALS

(71) Applicant: TOYOTA JIDOSHA KABUSHIKI KAISHA, Toyota-shi, Aichi-ken (JP)

(72) Inventors: Hidetsugu Hamada, Toyota (JP); Toshiya Hashimoto, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 161 days.

(21) Appl. No.: 15/190,441

(22) Filed: Jun. 23, 2016

(65) Prior Publication Data
US 2016/0380430 A1 Dec. 29, 2016

(30) Foreign Application Priority Data

Jun. 29, 2015 (JP) ................................ 2015-129524

(51) Int. Cl.
*H02J 1/00* (2006.01)
*H02M 3/158* (2006.01)
*H02J 7/00* (2006.01)

(52) U.S. Cl.
CPC .............. *H02J 1/00* (2013.01); *H02J 7/0024* (2013.01); *H02M 3/1584* (2013.01)

(58) Field of Classification Search
CPC ........................................................ H02J 1/00
USPC ........................................................ 307/43
See application file for complete search history.

(56) References Cited

U.S. PATENT DOCUMENTS

| 4,059,807 | A * | 11/1977 | Hamada | H03F 1/34 330/10 |
| 9,431,824 | B2 * | 8/2016 | Ishigaki | H02M 3/158 |
| 9,725,007 | B2 * | 8/2017 | Hashimoto | B60L 11/1868 |
| 2010/0270998 | A1 * | 10/2010 | Caubert | H02M 7/53871 323/312 |
| 2012/0323430 | A1 * | 12/2012 | Nakamura | B60L 11/1803 701/22 |
| 2013/0134786 | A1 | 5/2013 | Ishigaki et al. | |
| 2013/0155739 | A1 * | 6/2013 | Itako | G05F 1/67 363/95 |
| 2015/0084422 | A1 | 3/2015 | Ishigaki et al. | |
| 2016/0137069 | A1 | 5/2016 | Ishigaki et al. | |
| 2016/0211771 | A1 * | 7/2016 | Ichihara | H02M 1/08 |

(Continued)

FOREIGN PATENT DOCUMENTS

CN 103141019 A 6/2013
JP 2015-002573 A 1/2015

*Primary Examiner* — Adi Amrany
(74) *Attorney, Agent, or Firm* — Finnegan, Henderson, Farabow, Garrett & Dunner, LLP

(57) ABSTRACT

A power supply apparatus may include an electronic control unit. The electronic control unit may be configured to set target timing of switching of each of the switch. The electronic control unit may be configured to set the target timing in one cycle of a first carrier wave in accordance with first timing and in one cycle of a second carrier wave in accordance with second timing. The first timing may be two of timing in the one cycle of the first carrier wave that are defined by a first target duty ratio and the first carrier wave. The second timing may be two of timing in the one cycle of the second carrier wave that are defined by a second target duty ratio and the second carrier wave. The second carrier wave may be in the same cycle as the first carrier wave.

13 Claims, 15 Drawing Sheets

(56) References Cited

U.S. PATENT DOCUMENTS

2016/0211790 A1* 7/2016 Ajima ................. B60L 11/1803
2017/0018921 A1* 1/2017 Tomura .................... H02J 1/00
2017/0279371 A1* 9/2017 Yamashita ............. H02M 7/48
2018/0026569 A1* 1/2018 Yoshimura ............. H02P 27/14
                                                        290/31

* cited by examiner

FIG. 9

| CONDITION | CONTROL SIGNAL | TARGET TIMING OF EDGE | |
|---|---|---|---|
| Du1*+Du2*<1 | S1a | High | |
| | S2a | RISE $Tw+\tau d1+\tau dt$ | FALL $Tw+\tau w$ |
| | S3a | FALL $Tw+\tau d1$ | RISE $Tw+\tau w-\tau d2+\tau dt$ |
| | S4a | FALL $Tw+\tau w-\tau d2$ | RISE $Tw+\tau w+\tau dt$ |
| Du1*+Du2*>1 | S1a | FALL $Tw+\tau w-\tau d2$ | RISE $Tw+\tau d1+\tau dt$ |
| | S2a | RISE $Tw+\tau w-\tau d2+\tau dt$ | FALL $Tw+\tau w$ |
| | S3a | High | |
| | S4a | FALL $Tw+\tau d1$ | RISE $Tw+\tau w+\tau dt$ |
| Du1*+Du2*=1 | S1a | High | |
| | S2a | RISE $Tw+\tau d1+\tau dt$ | FALL $Tw+\tau w$ |
| | S3a | High | |
| | S4a | FALL $Tw+\tau w-\tau d2$ | RISE $Tw+\tau w+\tau dt$ |

FIG. 12

| CONDITION | CONTROL SIGNAL | TARGET TIMING OF EDGE | |
|---|---|---|---|
| Du1*+Du2*<1 | S1a | High | |
| | S2a | FALL<br>Tw+τw−τd1 | RISE<br>Tw+τw+τdt |
| | S3a | FALL<br>Tw+τd2 | RISE<br>Tw+τw−τd1+τdt |
| | S4a | RISE<br>Tw+τd2+τdt | FALL<br>Tw+τw |
| Du1*+Du2*>1 | S1a | FALL<br>Tw+τw−τd1 | RISE<br>Tw+τd2+τdt |
| | S2a | FALL<br>Tw+τd2 | RISE<br>Tw+τw+τdt |
| | S3a | High | |
| | S4a | RISE<br>Tw+τw−τd1+τdt | FALL<br>Tw+τw |
| Du1*+Du2*=1 | S1a | High | |
| | S2a | FALL<br>Tw+τd2 | RISE<br>Tw+τw+τdt |
| | S3a | High | |
| | S4a | RISE<br>Tw+τw−τd1+τdt | FALL<br>Tw+τw |

FIG. 13

| CONDITION | CONTROL SIGNAL | TARGET TIMING OF EDGE ||
|---|---|---|---|
| Du1*<Du2* | S1a | RISE $Tw+\tau d1+\tau dt$ | FALL $Tw+\tau w$ |
| | S2a | High ||
| | S3a | FALL $Tw+\tau d2$ | RISE $Tw+\tau w+\tau dt$ |
| | S4a | FALL $Tw+\tau d1$ | RISE $Tw+\tau d2+\tau dt$ |
| Du1*>Du2* | S1a | RISE $Tw+\tau d2+\tau dt$ | FALL $Tw+\tau w$ |
| | S2a | FALL $Tw+\tau d2$ | RISE $Tw+\tau d1+\tau dt$ |
| | S3a | FALL $Tw+\tau d1$ | RISE $Tw+\tau w+\tau dt$ |
| | S4a | High ||
| Du1*=Du2* | S1a | RISE $Tw+\tau d2+\tau dt$ | FALL $Tw+\tau w$ |
| | S2a | High ||
| | S3a | FALL $Tw+\tau d1$ | RISE $Tw+\tau w+\tau dt$ |
| | S4a | High ||

FIG. 14

| CONDITION | CONTROL SIGNAL | TARGET TIMING OF EDGE | |
|---|---|---|---|
| Du1*<Du2* | S1a | FALL<br>Tw+τw−τd1 | RISE<br>Tw+τw |
| | S2a | High | |
| | S3a | RISE<br>Tw+τw−τd2+τdt | FALL<br>Tw+τw |
| | S4a | FALL<br>Tw+τw−τd2 | RISE<br>Tw+τw−τd1+τdt |
| Du1*>Du2* | S1a | FALL<br>Tw+τw−τd2 | RISE<br>Tw+τw |
| | S2a | FALL<br>Tw+τw−τd1 | RISE<br>Tw+τw−τd2+τdt |
| | S3a | RISE<br>Tw+τw−τd1+τdt | FALL<br>Tw+τw |
| | S4a | High | |
| Du1*=Du2* | S1a | FALL<br>Tw+τw−τd2 | RISE<br>Tw+τw |
| | S2a | High | |
| | S3a | RISE<br>Tw+τw−τd1+τdt | FALL<br>Tw+τw |
| | S4a | High | |

| CONDITION | TARGET TIMING | TIME | COMBINATION OF S1a, S2a, S3a, S4a |
|---|---|---|---|
| Du1*+Du2*<1 | T11 | Tw+τd1 | 1,1,0,1 |
| | T12 | Tw+τw-τd2 | 1,1,1,0 |
| | T13 | Tw+τw | 1,0,1,1 |
| Du1*+Du2*>1 | T11 | Tw+τw-τd2 | 0,1,1,1 |
| | T12 | Tw+τd1 | 1,1,1,0 |
| | T13 | Tw+τw | 1,0,1,1 |
| Du1*+Du2*=1 | T11=T12 | Tw+τd1 (Tw+τw-τd2) | 1,1,1,0 |
| | T13 | Tw+τw | 1,0,1,1 |

| CONDITION | TARGET TIMING | TIME | COMBINATION OF S1a, S2a, S3a, S4a |
|---|---|---|---|
| Du1*+Du2*<1 | T11 | Tw+τd2 | 1,1,0,1 |
|  | T12 | Tw+τw−τd1 | 1,0,1,1 |
|  | T13 | Tw+τw | 1,1,1,0 |
| Du1*+Du2*>1 | T11 | Tw+τw−τd1 | 0,1,1,1 |
|  | T12 | Tw+τd2 | 1,0,1,1 |
|  | T13 | Tw+τw | 1,1,1,0 |
| Du1*+Du2*=1 | T11=T12 | Tw+τd2 (Tw+τw−τd1) | 1,0,1,1 |
|  | T13 | Tw+τw | 1,1,1,0 |

FIG. 22

| CONDITION | TARGET TIMING | TIME | COMBINATION OF S1a, S2a, S3a, S4a |
|---|---|---|---|
| Du1*<Du2* | T11 | Tw+τd1 | 1,1,1,0 |
| | T12 | Tw+τd2 | 1,1,0,1 |
| | T13 | Tw+τw | 0,1,1,1 |
| Du1*>Du2* | T11 | Tw+τd2 | 1,0,1,1 |
| | T12 | Tw+τd1 | 1,1,0,1 |
| | T13 | Tw+τw | 0,1,1,1 |
| Du1*=Du2* | T11=T12 | Tw+τd1 (Tw+τd2) | 1,1,0,1 |
| | T13 | Tw+τw | 0,1,1,1 |

FIG. 23

| CONDITION | TARGET TIMING | TIME | COMBINATION OF S1a, S2a, S3a, S4a |
|---|---|---|---|
| Du1*<Du2* | T11 | Tw+τw−τd2 | 1,1,1,0 |
| | T12 | Tw+τw−τd1 | 0,1,1,1 |
| | T13 | Tw+τw | 1,1,0,1 |
| Du1*>Du2* | T11 | Tw+τw−τd1 | 1,0,1,1 |
| | T12 | Tw+τw−τd2 | 0,1,1,1 |
| | T13 | Tw+τw | 1,1,0,1 |
| Du1*=Du2* | T11=T12 | Tw+τw−τd2 (Tw+τw−τd1) | 0,1,1,1 |
| | T13 | Tw+τw | 1,1,0,1 |

POWER SUPPLY APPARATUS FOR SETTING TARGET TIMES OF CONTROL SIGNALS

CROSS-REFERENCE TO RELATED APPLICATION

This application is based upon and claims the benefit of priority from Japanese Patent Application No. 2015-129524, filed on Jun. 29, 2015, which is incorporated herein by reference in its entirety.

TECHNICAL FIELD

This disclosure relates to a power supply apparatus.

BACKGROUND

A power supply apparatus may include: first and second power supplies; and a converter having first to fourth switching elements, first to fourth diodes, and first and second reactors and connected to the first power supply, the second power supply, and a load and that boosts power from the first and second power supplies and supplies the power to the load by controlling the first to fourth switching elements (see Japanese Patent Application Publication No. 2012-070514, for example). This power supply apparatus generates control signals for the first to fourth switching elements based on a logical operation of a first control pulse signal for controlling output of the first power supply and a second control pulse signal for controlling output of the second power supply, and uses these control signals to execute switching control of the first to fourth switching elements. At this time, it is adapted such that rise timing of the first control pulse signal overlaps rise timing of the second control pulse signal.

The above-described power supply apparatus is required to sequentially perform the logical operation by an arithmetic unit or to be provided with a logic circuit between the arithmetic unit and the first to fourth switching elements in order to generate the control signals for the first to fourth switching elements from the first and second control pulse signals. Such a problem arises that a processing load of the arithmetic unit becomes relatively large in the former case and the number of components of the power supply apparatus becomes relatively large in the latter case.

SUMMARY

This disclosure describes a power supply apparatus that can execute switching control of four switches of a converter and that does not have to sequentially perform a logical operation by a control unit for controlling the converter or provide a logic circuit between the control unit and the four switches of the converter.

Embodiments of this disclosure may include a power supply apparatus that includes: a first power supply; a second power supply; a converter that is connected to a first power line, to which the first power supply is connected, a second power line, to which the second power supply is connected, and a third power line, to which a load is connected, and can boost and supply power of the first and second power lines to the third power line; and a control unit for controlling the converter, in which the converter has: first to fourth switches that are connected in series between a positive bus bar of the third power line and negative bus bars of the first and third power lines; first to fourth diodes that are connected in parallel to the first to fourth switches, respectively; a first reactor that is connected to a connection point between the second switch and the third switch and a positive bus bar of the first power line; and a second reactor that is connected to a connection point between the first switch and the second switch and a positive bus bar of the second power line, in which a connection point between the third switch and the fourth switch is connected to a negative bus bar of the second power line, in which the control unit sets target timing for switching of each of the first to fourth switches in one cycle of first and second carrier waves in accordance with two of timing in the one cycle of the first carrier wave that are defined by a first duty ratio for controlling first power supplied from the first power line to the third power line and the first carrier wave for controlling said first power and two of timing in the one cycle of the second carrier wave that are defined by a second target duty ratio for controlling second power supplied from the second power line to the third power line and the second carrier wave that is a carrier wave for controlling said second power and is in the same cycle as the first carrier wave, and outputs a switching command to the first to fourth switch sides in accordance with each of the set target timing.

In an embodiment, the control unit may set the target timing for switching of each of the first to fourth switches in the one cycle of the first and second carrier waves in accordance with the two of the timing in the one cycle of the first carrier wave that is defined by the first target duty ratio for controlling the first power supplied from the first power line to the third power line and the first carrier wave for controlling the first power and the two of the timing in the one cycle of the second carrier wave that is defined by the second target duty ratio for controlling the second power supplied from the second power line to the third power line and the second carrier wave that is the carrier wave for controlling the second power and is in the same cycle as the first carrier wave, and outputs the switching command to the first to fourth switch sides in accordance with each of the set target timing. In this way, switching control of the first to fourth switches can be executed without sequentially performing logical operations in the control unit and providing a logic circuit between the control unit and the first to fourth switches. As a result, compared to a power supply apparatus in which the control unit sequentially performs the logical operations, a processing load of the control unit can be reduced. In addition, compared to a power supply apparatus that is provided with the logic circuit, the number of components of the power supply apparatus can be reduced.

In such a power supply apparatus, the first carrier wave may be a sawtooth wave or a reverse-sawtooth wave, the second carrier wave may be a sawtooth wave or a reverse-sawtooth wave, reset timing thereof may match that of the first carrier wave, the two of the timing in the one cycle of the first carrier wave may be the reset timing and timing other than said reset timing, the two of the timing in the one cycle of the second carrier wave may be the reset timing and timing other than said reset timing, and the control unit may set the target timing of the first to fourth switches in the one cycle of the first and second carrier waves in accordance with three of timing that are the reset timing and two of the timing other than the reset timing in the one cycle of the first and second carrier waves. In this way, the target timing of the first to fourth switches in the one cycle of the first and second carrier waves can be set in accordance with the three of the timing in the cycle.

In the power supply apparatus in which the target timing of the first to fourth switches in the one cycle of the first and second carrier waves are set in accordance with the three of the timing in the one cycle of the first and second carrier waves, the control unit may separately set the target timing of each of the first to fourth switches in the one cycle of the first and the second carrier waves in accordance with the three of the timing in the one cycle of the first and second carrier waves and output the switching command to the corresponding switch sides of the first to fourth switches when time reaches each of the set target timing. In this way, the first to fourth switches can be controlled by separately setting the target timing of each of the first to fourth switches in the one cycle of the first and second carrier waves.

In the power supply apparatus in which the target timing of each of the first to fourth switches in the one cycle of the first and second carrier waves are separately set, the control unit may separately set the target timing for each of the first to fourth switches in the one cycle of the first and second carrier waves in accordance with the three of the timing in the one cycle of the first and second carrier waves and either a magnitude relationship between a sum of the first and second target duty ratios and a value 1 or a magnitude relationship between the first target duty ratio and the second target duty ratio. In this case, the control unit may separately set the target timing for each of the first to fourth switches in the one cycle of the first and second carrier waves in accordance with the three of the timing in the one cycle of the first and second carrier waves, either the magnitude relationship between the sum of the first and second target duty ratios and the value 1 or the magnitude relationship between the first target duty ratio and the second target duty ratio, whether the first carrier wave is the sawtooth wave or the reverse-sawtooth wave, and whether the second carrier wave is the sawtooth wave or the reverse-sawtooth wave.

In addition, in the power supply apparatus in which the target timing for each of the first to fourth switches in the one cycle of the first and second carrier waves are separately set, the control unit may separately set the target timing for each of the first to fourth switches in consideration of a dead time that is required for switching of each of the first to fourth switches. In this way, the target timing for each of the first to fourth switches in the one cycle of the first and second carrier waves can be separately set in consideration of the dead time.

In the power supply apparatus in which the target timing of the first to fourth switches in the one cycle of the first and second carrier waves are set in accordance with the three of the timing in the one cycle of the first and second carrier waves, the control unit may set the three of the timing in the one cycle of the first and second carrier waves as three of the target timing of the first to fourth switches in the one cycle of the first and second carrier waves, may set a combination of ON/OFF states of the first to fourth switches for each of the three of the target timing in the one cycle of the first and second carrier waves, and may output the switching command or a keeping command to each side of the first to fourth switches in accordance with the set combination and the ON/OFF states of the first to fourth switches when the time reaches each of the set target timing. In this way, the first to fourth switches can be controlled by setting the combination of the ON/OFF states of the first to fourth switches for each of the three of the target timing in the one cycle of the first and second carrier waves.

In the power supply apparatus in which the combination of the ON/OFF states of the first to fourth switches is set for each of the three of the target timing in the one cycle of the first and second carrier waves, the control unit may set the combination for each of the three of the target timing in the one cycle of the first and second carrier waves in accordance with the magnitude relationship between the sum of the first and second target duty ratios and the value 1 or the magnitude relationship between the first target duty ratio and the second target duty ratio. In this case, the control unit may set the combination for each of the three of the target timing in the one cycle of the first and second carrier waves in accordance with either the magnitude relationship between the sum of the first and second target duty ratios and the value 1 or the magnitude relationship between the first target duty ratio and the second target duty ratio, whether the first carrier wave is the sawtooth wave or the reverse-sawtooth wave, and whether the second carrier wave is the sawtooth wave or the reverse-sawtooth wave.

In the power supply apparatus in which the combination of the ON/OFF states of the first to fourth switches is set for each of the three of the target timing in the one cycle of the first and second carrier waves, a dead time generation circuit for adding the dead time that may be adopted for switching of each of the first to fourth switches to output from the control unit and outputting the output, to which the dead time is added, to the first to fourth elements may be provided. In this embodiment, the dead time generation circuit may add the dead time to the output from the control unit and output the output when the output is the switching command from OFF to ON. The dead time generation circuit may output the output from the control unit without adding the dead time to the output when the output is the switching command from ON to OFF or the keeping command.

In the power supply apparatus, the control unit may generate a first control signal for controlling the first power by using the first target duty ratio and the first carrier wave, may generate a second control signal for controlling the second power by using the second target duty ratio and the second carrier wave, may set rise and fall timing of the first control signal as the two of the timing in the one cycle of the first carrier wave, and may set rise and fall timing of the second control signal as the two of the timing in the one cycle of the second carrier wave.

Some embodiments may include a power supply apparatus that includes: a first power supply; a second power supply; a converter that is connected to a first power line, to which the first power supply is connected, a second power line, to which the second power supply is connected, and a third power line, to which a load is connected, and can boost and supply power of the first and second power lines to the third power line; and a control unit for controlling the converter, in which the converter has: first to fourth switches that are connected in series between a positive bus bar of the third power line and negative bus bars of the first and third power lines; first to fourth diodes that are connected in parallel to the first to fourth switches, respectively; a first reactor that is connected to a connection point between the second switch and the third switch and a positive bus bar of the first power line; and a second reactor that is connected to a connection point between the first switch and the second switch and a positive bus bar of the second power line, in which a connection point between the third switch and the fourth switch is connected to a negative bus bar of the second power line, and in which the control unit sets target timing for switching of each of the first to fourth switches in one cycle of first and second carrier waves in accordance with rise and fall timing in one cycle of a first control signal for controlling the first power that is supplied from the first power line to the third power line and rise and fall timing in one cycle of a second control signal for controlling the second power that is supplied from the second power line to the third power line, and outputs a switching command to the first to fourth switch sides in accordance with each of the set target timing.

In the power supply apparatus, the control unit sets the target timing for switching of each of the first to fourth switches in the one cycle of the first and second carrier waves in accordance with the rise and fall timing in the one cycle of the first control signal for controlling the first power that is supplied from the first power line to the third power line and the rise and fall timing in the one cycle of the second control signal for controlling the second power that is supplied from the second power line to the third power line, and outputs the switching command to the first to fourth switch sides in accordance with each of the set target timing. In this way, the switching control of the switches can be executed without sequentially performing the logical operations by the control unit and providing the logic circuit between the control unit and the first to fourth switches. As a result, compared to the power supply apparatus in which the control unit sequentially performs the logical operations, the processing load of the control unit can be reduced. In addition, compared to the power supply apparatus that is provided with the logic circuit, the number of components of the power supply apparatus can be reduced.

BRIEF DESCRIPTION OF THE DRAWINGS

Exemplary embodiments of the disclosure will be described below with reference to the accompanying drawings, in which like numerals denote like elements, and wherein:

FIG. 9 is an explanatory table that shows target timing of each of edges of control signals S1a to S4a for switches S1 to S4 in a next cycle of carrier waves Ca1, Ca2 in accordance with disclosed embodiments;

FIG. 12 is an explanatory table that shows target timing of each of the edges of the control signals S1a to S4a for the switches S1 to S4 in the next cycle of the carrier waves Ca1, Ca2 in the modified example in accordance with disclosed embodiments;

FIG. 13 is an explanatory table that shows target timing of each of the edges of the control signals S1a to S4a for the switches S1 to S4 in the next cycle of the carrier waves Ca1, Ca2 in the modified example in accordance with disclosed embodiments;

FIG. 14 is an explanatory table that shows target timing of each of the edges of the control signals S1a to S4a for the switches S1 to S4 in the next cycle of the carrier waves Ca1, Ca2 in the modified example in accordance with disclosed embodiments;

FIG. 22 is an explanatory table that shows the target timing T11 to T13 in the next cycle of the carrier waves Ca1, Ca2 of the modified example and a combination of the control signals S1a to S4a for the switches S1 to S4 at each of the target timing T11 to T13 in accordance with disclosed embodiments; and FIG. 23 is an explanatory table that shows the target timing T11 to T13 in the next cycle of the carrier waves Ca1, Ca2 of the modified example and a combination of the control signals S1a to S4a for the switches S1 to S4 at each of the target timing T11 to T13 in accordance with disclosed embodiments.

DETAILED DESCRIPTION OF EMBODIMENTS

Next, a mode in accordance with the disclosure will be described by using embodiments.

Figure 1:
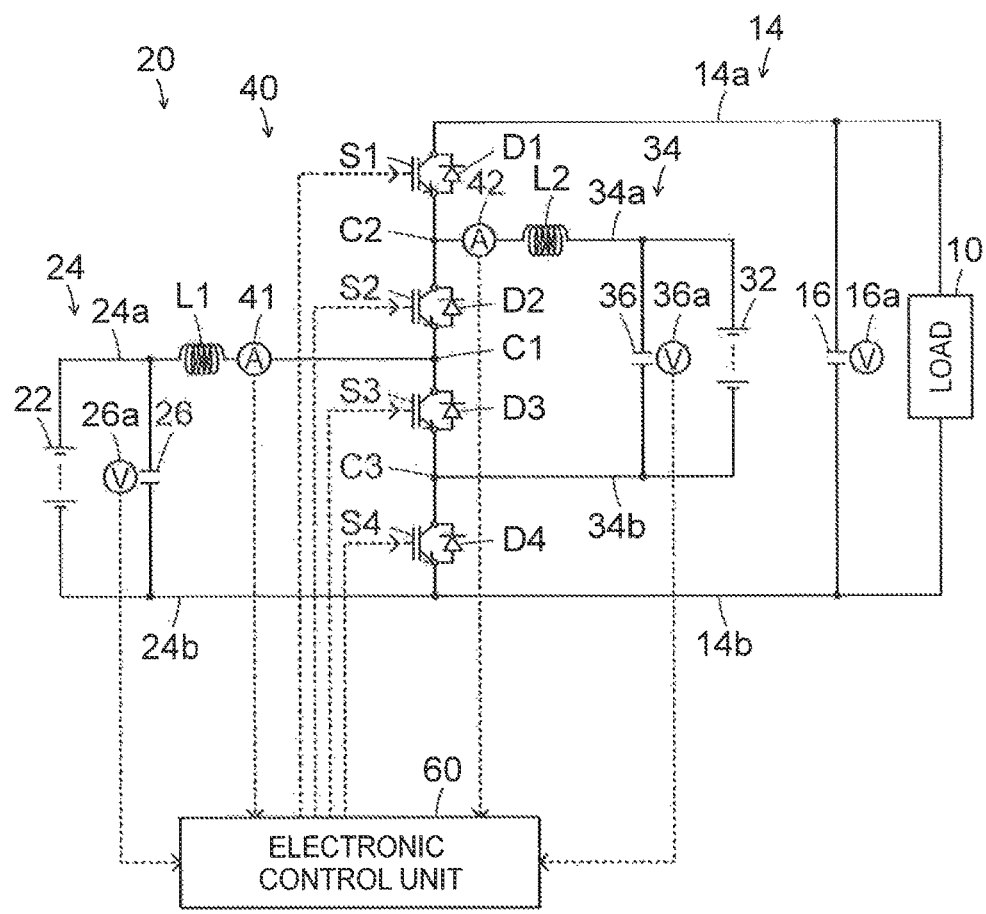
FIG. 1 is a configuration diagram that schematically shows a configuration of a power supply apparatus 20 of a first embodiment.

FIG. 1 is a configuration diagram that schematically shows a configuration of a power supply apparatus 20 of a first embodiment of the disclosure. The power supply apparatus 20 of the first embodiment is configured as an apparatus for supplying power to a load 10, and, as shown in the drawing, includes a battery 22 as a first power supply, a battery 32 as a second power supply, a converter 40, and an electronic control unit 60. Noted that, as the load 10, a motor, an inverter for driving this motor, and the like can be considered.

The converter 40 is connected to a power line 24 to which the battery 22 is connected, a power line 34 to which the battery 32 is connected, and a power line 14 to which the load 10 is connected, and is configured to be able to boost power of the power lines 24, 34 (the batteries 22, 32) and supply the power to the power line 14 (the load 10). This converter 40 includes switches S1 to S4, diodes D1 to D4, and reactors L1, L2. The switches S1 to S4 each may be an insulated gate bipolar transistor (IGBT), for example, and are sequentially connected in series between a positive bus bar 14a of the power line 14 and negative bus bars 14b, 24b of the power lines 14, 24. The diodes D1 to D4 are respectively connected to the switches S1 to S4 in parallel in a reverse direction. The first reactor L1 is connected to a connection point C1 between the switch S2 and the switch S3 and to a positive bus bar 24a of the power line 24. The second reactor L2 is connected to a connection point C2 between the switch S1 and the switch S2 and to a positive bus bar 34a of the power line 34. Furthermore, a connection point C3 between the switch S3 and the switch S4 is connected to a negative bus bar 34b of the power line 34. Noted that a smoothing capacitor 16 is connected to the power line 14, a smoothing capacitor 26 is connected to the power line 24, and a smoothing capacitor 36 is connected to the power line 34.

The electronic control unit 60 is configured as a microprocessor that has a CPU as a central component, and includes, in addition to the CPU, a ROM for storing a processing program, a RAM for temporarily storing data, a timer for timekeeping, a matching output section for performing specific output at a time when a time keeping value of the timer matches a setting value, and input/output ports.

The electronic control unit 60 receives signals from various sensors via the input port. The following can be raised as the signals received by the electronic control unit 60:

A voltage VH of the capacitor 16 (the power line 14) from a voltage sensor 16a that is attached between terminals of the capacitor 16.

A voltage VL1 of the capacitor 26 (the power line 24) from a voltage sensor 26a that is attached between terminals of the capacitor 26.

A current IL1 from a current sensor 41 that is attached between the connection point between the switch S2 and the switch S3 and the reactor L1.

A current IL2 from a current sensor 42 that is attached between the connection point between the switch S1 and the switch S2 and the reactor L2.

A voltage VL2 of the capacitor 36 (the power line 34) from a voltage sensor 36a that is attached between terminals of the capacitor 36.

A power supply voltage VB1 from a voltage sensor that is attached between terminals of the battery 22.

A battery current IB1 from a current sensor that is attached to the positive electrode terminal of the battery 22.

A power supply voltage VB2 from a voltage sensor that is attached between terminals of the battery 32.

A battery current IB2 from a current sensor that is attached to the positive electrode terminal of the battery 32.

The electronic control unit 60 outputs control signals S1a to S4a for the switches S1 to S4 via the output port. In addition, the electronic control unit 60 computes states of charge SOC1, SOC2 of the batteries 22, 32 based on the battery current IB1 and the battery current IB2 from the current sensors. Each of the states of charge SOC is a ratio of power capacity that can be discharged from each of the batteries 22, 32 to full capacity of each of the batteries 22, 32.

In the power supply apparatus 20 of the first embodiment that is configured as described above, the converter 40 functions as a converter in which the switches S1, S2 serve as an upper arm and the switches S3, S4 serve as a lower arm (hereinafter referred to as a "first power supply converter") between the power line 24 and the power line 14, that is, for the battery 22.

Figure 2:
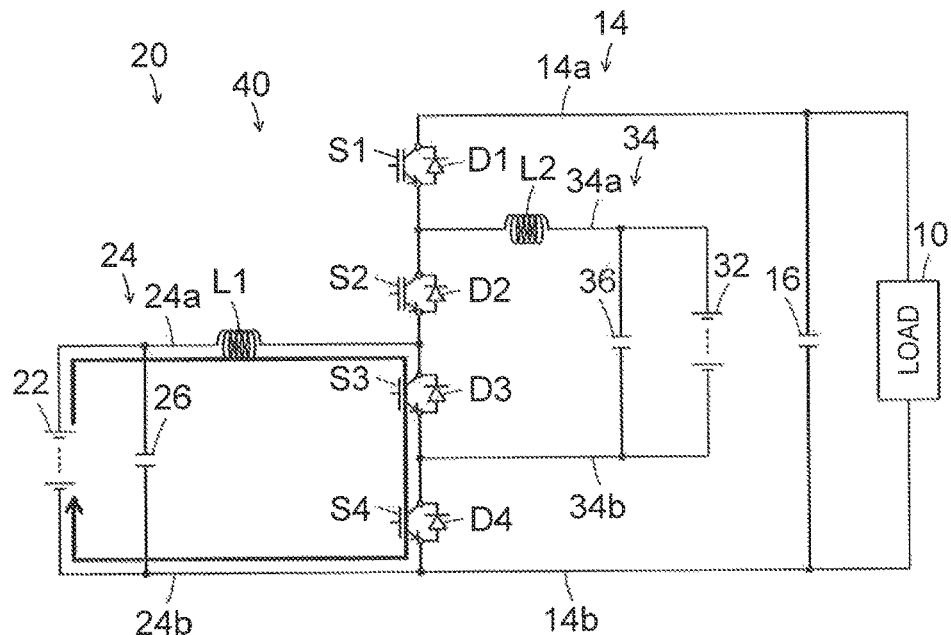
FIG. 2 is an explanatory view that shows a situation where a converter 40 functions as a first power supply converter in accordance with disclosed embodiments.
Figure 3:
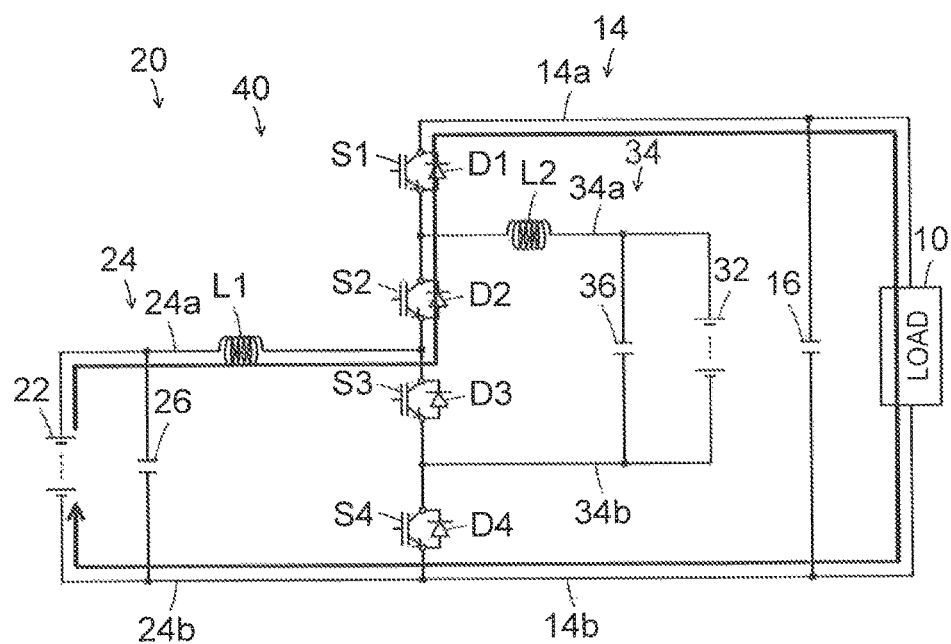
FIG. 3 is an explanatory view that shows a situation where the converter 40 functions as the first power supply converter in accordance with disclosed embodiments.

In this case, in a state where the lower arm (the switches S3, S4) is ON and the upper arm (the switches S1, S2) is OFF (hereinafter referred to as a "first storage state"), as shown in FIG. 2, a circuit through which a current flows in order of the battery 22, the positive bus bar 24a of the power line 24, the reactor L1, the switch S3, the switch S4, the negative bus bar 24b of the power line 24, and the battery 22 (hereinafter referred to as a "first storage circuit") is formed. At this time, energy is stored in the reactor L1. Then, when the first storage state is switched to a state where the lower arm (the switches S3, S4) is OFF and the upper arm (the switches S1, S2) is ON (hereinafter referred to as a "first discharge state"), as shown in FIG. 3, the first storage circuit is switched to a circuit through which the current flows in order of the battery 22, the positive bus bar 24a of the power line 24, the reactor L1, the diode D2, the diode D1, the positive bus bar 14a of the power line 14, the load 10, the negative bus bar 14b of the power line 14, the negative bus bar 24b of the power line 24, and the battery 22 (hereinafter referred to as a "first discharge circuit"). At this time, together with energy of the power line 24 (the battery 22), the energy of the reactor L1 is supplied to the power line 14 (the load 10). Thus, the first storage circuit and the first discharge circuit are alternately formed by alternately generating the first storage state and the first discharge state. In this way, the power of the power line 24 is boosted and supplied to the power line 14.

In addition, the converter 40 functions as a converter in which the switches S1, S4 serve as an upper arm and the switches S2, S3 serve as a lower arm (hereinafter referred to as a "second power supply converter") between the power line 34 and the power line 14, that is, for the battery 32.

Figure 4:
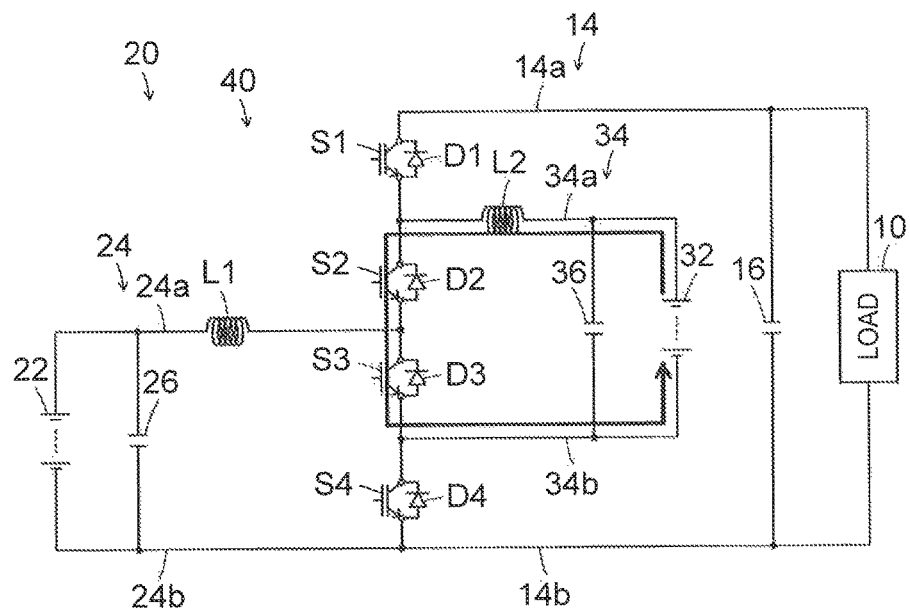
FIG. 4 is an explanatory view that shows a situation where the converter 40 functions as a second power supply converter in accordance with disclosed embodiments.
Figure 5:
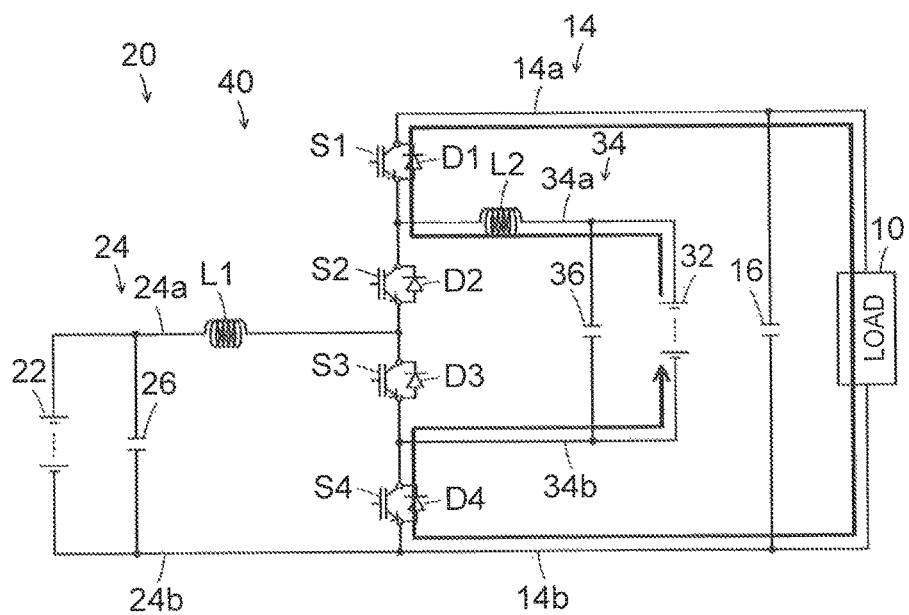
FIG. 5 is an explanatory view that shows a situation where the converter 40 functions as the second power supply converter in accordance with disclosed embodiments.

In this case, in a state where the lower arm (the switches S2, S3) is ON and the upper arm (the switches S1, S4) is OFF (hereinafter referred to as a "second storage state"), as shown in FIG. 4, a circuit through which a current flows in order of the battery 32, the positive bus bar 34a of the power line 34, the reactor L2, the switch S2, the switch S3, the negative bus bar 34b of the power line 34, and the battery 32 (hereinafter referred to as a "second storage circuit") is formed. At this time, energy is stored in the reactor L2. Then, when the second storage state is switched to a state where the lower arm (the switches S2, S3) is OFF and the upper arm (the switches S1, S4) is ON (hereinafter referred to as a "second discharge state"), as shown in FIG. 5, the second storage circuit is switched to a circuit through which the current flows in order of the battery 32, the positive bus bar 34a of the power line 34, the reactor L2, the diode D1, the positive bus bar 14a of the power line 14, the load 10, the negative bus bar 14b of the power line 14, the diode D4, the negative bus bar 34b of the power line 34, and the battery 32 (hereinafter referred to as a "second discharge circuit"). At this time, together with energy of the power line 34 (the battery 32), the energy of the reactor L2 is supplied to the power line 14 (the load 10). Thus, the second storage circuit and the second discharge circuit are alternately formed by alternately generating the second storage state and the second discharge state. In this way, the power of the power line 34 is boosted and supplied to the power line 14.

In light of these, in the first embodiment, the switches S1 to S4 of the converter 40 are subjected to switching control such that the voltage VH of the power line 14 becomes a target voltage VH* thereof (a difference between the target voltage VH* and the voltage VH is eliminated) by a function as the first power supply converter and that the current IL2 flowing through the reactor L2 becomes a target current IL2* (a difference between the target current IL2* and the current IL2 is eliminated) by a function as the second power supply converter. Here, the target voltage VH* of the power line 14 can be set on the basis of target power of the load 10 (target torque and a rotational speed of a motor in the case where the load 10 is the motor) and the like. In addition, the target current IL2* of the reactor L2 can be set on the basis of the states of charge SOC1, SOC2 of the batteries 22, 32 and the like.

Figure 6:
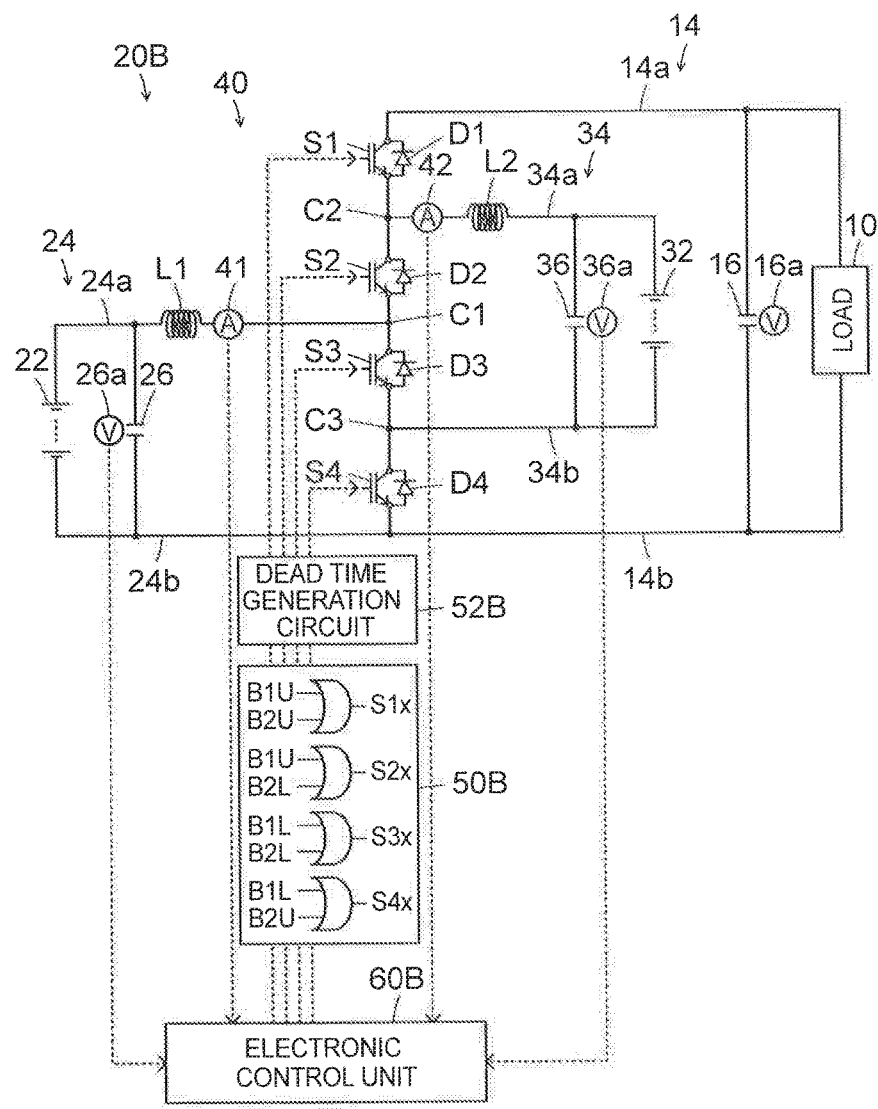
FIG. 6 is a configuration diagram that schematically shows a configuration of a power supply apparatus 20B of a comparative example in accordance with disclosed embodiments.

Here, before describing the switching control of the switches S1 to S4 in the power supply apparatus 20 of the first embodiment, switching control of switches S1 to S4 in a power supply apparatus 20B of a comparative example will be described. As shown in FIG. 6, the power supply apparatus 20B of the comparative example includes, in addition to a hardware configuration of the power supply apparatus 20 of the first embodiment, a logic circuit 50B and a dead time generation circuit 52B between an electronic control unit 60B and the switches S1 to S4. In addition, the electronic control unit 60B in the power supply apparatus 20B of the comparative example differs from the electronic control unit 60 in the power supply apparatus 20 of the first embodiment in a point that the electronic control unit 60B outputs control signals B1U, B1L, B2U, B2L for upper and lower arms of first and second power supply converters, which will be described below, instead of the control signals S1a to S4a for the switches S1 to S4.

Figure 7:
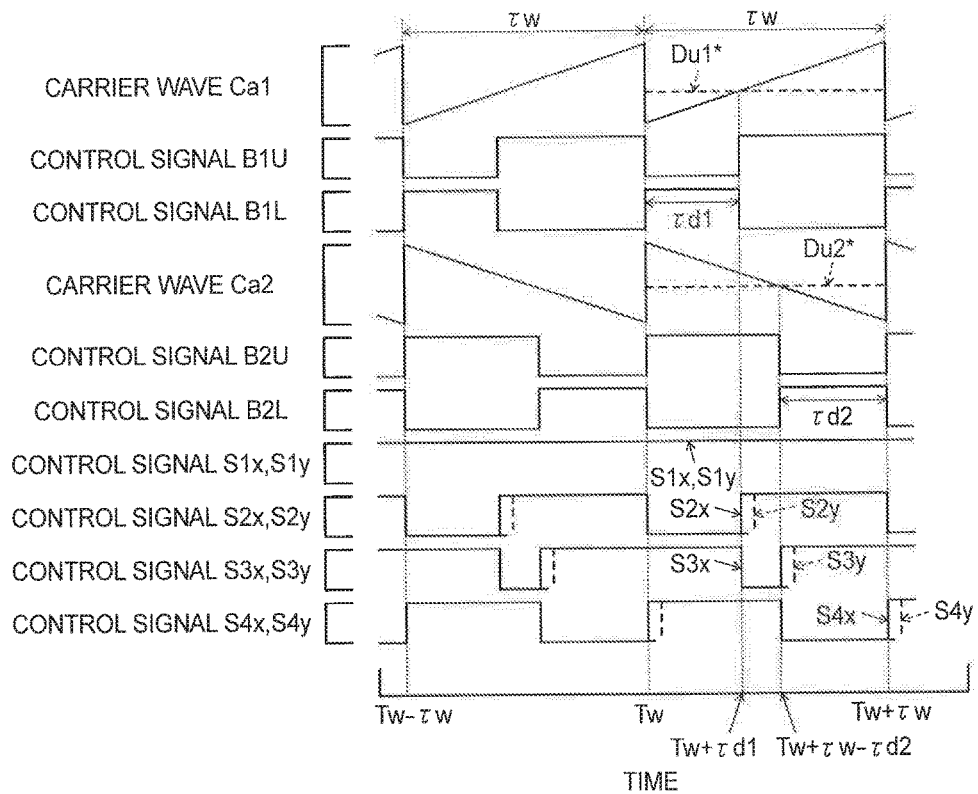
FIG. 7 is an explanatory view that shows one example of a timing chart in the power supply apparatus 20B of the comparative example in accordance with disclosed embodiments.

FIG. 7 is an explanatory view that shows one example of a timing chart in the power supply apparatus 20B of the comparative example. In the comparative example, a sawtooth wave is used as a carrier wave Ca1 for controlling first power that is supplied from a power line 24 (a battery 22) to a power line 14 (a load 10), and a reverse-sawtooth wave that is in the same cycle as the carrier wave Ca1 and whose reset timing matches that of the carrier wave Ca1 is used as a carrier wave Ca2 for controlling second power that is supplied from a power line 34 (a battery 32) to the power line 14 (the load 10). Here, the sawtooth wave means a waveform that repeats an increase from a value 0 to a value 1 and reset to the value 0, and the reverse-sawtooth wave means a waveform that repeats a decrease from a value 1 to a value 0 and reset to the value 1. In addition, in FIG. 7, "τw" indicates a time that corresponds to one cycle of the carrier waves Ca1, Ca2 (a cycle time), and "Tw" indicates final time of a current cycle of the carrier waves Ca1, Ca2 (reset timing). Thus, a range that is later than time Tw−τw) and before the time Tw corresponds to the current cycle of the carrier waves Ca1, Ca2, and a range that is later than the time Tw and before time (Tw+τw) corresponds to a next cycle of the carrier waves Ca1, Ca2.

In this comparative example, in the current cycle of the carrier waves Ca1, Ca2, the electronic control unit 60B first obtains a voltage VH of the power line 14 from a voltage sensor 16a and a current IL2 that flows through a reactor L2 from a current sensor 42. Next, the electronic control unit 60B sets a target duty ratio Du1* of the first power supply converter in the next cycle of the carrier wave Ca1 such that the voltage VI-H of the power line 14 becomes a target voltage VH*, and sets a target duty ratio Du2* of the second power supply converter in the next cycle of the carrier wave Ca2 such that the current IL2 flowing through the reactor L2 becomes a target current IL2*. The target duty ratios Du1*, Du2* are used to control the above-described first and second power.

Then, in the next cycle of the carrier waves Ca1, Ca2, the electronic control unit 60B sequentially generates the control signals B1U, B1L, B2U, B2L for the upper and lower arms of the first and second power supply converters on the basis of the target duty ratios Du1*, Du2* and the carrier waves Ca1, Ca2 of the first and second power supply converters, and outputs the control signals B1U, B1L, B2U, B2L to the logic circuit 50B. A method for generating the control signals B1U, B1L, B2U, B2L is specifically as will be described below. The control signal B1L for the lower arm of the first power supply converter is generated such that the lower arm of the first power supply converter is switched from ON to OFF at timing at which the carrier wave Ca1 and the target duty ratio Du1* become equal to each other (time (Tw+τd1)) during the increase of the carrier wave Ca1 and that the lower arm of the first power supply converter is switched from OFF to ON at reset timing of the carrier wave Ca1 (time (Tw+τw)). The control signal B1U for the upper arm of the first power supply converter is generated so as to become symmetrical (complementary output) to the control signal B1L for the lower arm of the first power supply converter. The control signal B2L for the lower arm of the second power supply converter is generated such that the lower arm of the second power supply converter is switched from OFF to ON at timing at which the carrier wave Ca2 and the target duty ratio Du2* become equal to each other (time (Tw+τw−τd2)) during a decrease of the carrier wave Ca2 and that the lower arm of the second power supply converter is switched from ON to OFF at reset timing (the time (Tw+τw)) of the carrier wave Ca2. The control signal B2U for the upper arm of the second power supply converter is generated so as to become symmetrical (complementary output) to the control signal B2L for the lower arm of the second power supply converter. Here, "τd1" is a time that is obtained by multiplying the cycle time τw of the carrier wave Ca1 by the target duty ratio Du1*, and corresponds to an ON time of the control signal B1L for the lower arm of the first power supply converter in the cycle time τw of the carrier wave Ca1. In addition, "τd2" is a time that is obtained by multiplying the cycle time Tw of the carrier wave Ca2 by the target duty ratio Du2*, and corresponds to an ON time of the control signal B2L for the lower arm of the second power supply converter in the cycle time τw of the carrier wave Ca2.

The logic circuit 50B is configured by using plural OR elements, generates control signals S1x to S4x for the switches S1 to S4 based on the control signals B1U, B1L, B2U, B21, for the upper and lower arms of the first and second power supply converters that are transmitted from the electronic control unit 60B, and outputs these control signals S1x to S4x to the dead time generation circuit 52B. As shown in FIG. 6, a method for generating the control signals S1x to S4x is specifically as will be described below. The control signal S1x for the switch S1 is generated as a logical disjunction of the control signals B1U, B2U. This is based on a fact that the switch S1 forms a part of each of the upper arms of the first and second power supply converters. The control signal S2x of the switch S2 is generated as a logical disjunction of the control signals B1U, B2L. This is based on a fact that the switch S2 forms a part of the upper arm of the first power supply converter and also forms a part of the lower arm of the second power supply converter. The control signal S3x of the switch S3 is generated as a logical disjunction of the control signals B1L, B2L. This is based on a fact that the switch S3 forms a part of each of the lower arms of the first and second power supply converters. The control signal S4x of the switch S4 is generated as a logical disjunction of the control signals B1L, B2U. This is based on a fact that the switch S4 forms a part of the lower arm of the first power supply converter and also forms a part of the upper arm of the second power supply converter.

The dead time generation circuit 52B is configured by using a resistor, a diode, and a capacitor, generates control signals S1y to S4y for the switches S1 to S4 by adding a dead time that is required for switching of each of the switches S1 to S4 (a time required to avoid a short circuit between the positive bus bar 14a and the negative bus bar 14b of the power line 14) to each of the control signals S1x to S4x for the switches S1 to S4 that are transmitted from the logic circuit 50B, and outputs these control signals S1y to S4y to the switches S1 to S4. A method for generating the control signals S1y to S4y is specifically as will be described below. The control signals S1y to S4y are generated such that the control signals S1y to S4y are switched from OFF (Low) to ON (High) in a delayed manner from the control signals S1x to S4x by the dead time in the case where each of the control signals S1x to S4x is switched from OFF to ON. In addition, the control signals S1y to S4y are generated such that the control signals S1x to S4x respectively match the control signals S1y to S4y for times other than the above case.

As described above, in a case of the comparative example, the logic circuit 50 and the dead time generation circuit 52B have to be provided between the electronic control unit 60B and the switches S1 to S4. On the contrary, it is considered that the logic circuit 50B is not provided and the electronic control unit 60B sequentially performs logical operations that correspond to processing in the logic circuit 50B. However, such a problem that a processing load of the electronic control unit 60B becomes relatively large arises in this case. Thus, it has been requested that the switching control of the switches S1 to S4 can be executed without providing the logic circuit 50B and sequentially performing the logical operations that correspond to the processing in the logic circuit 50B by the electronic control unit 60B.

Figure 8:
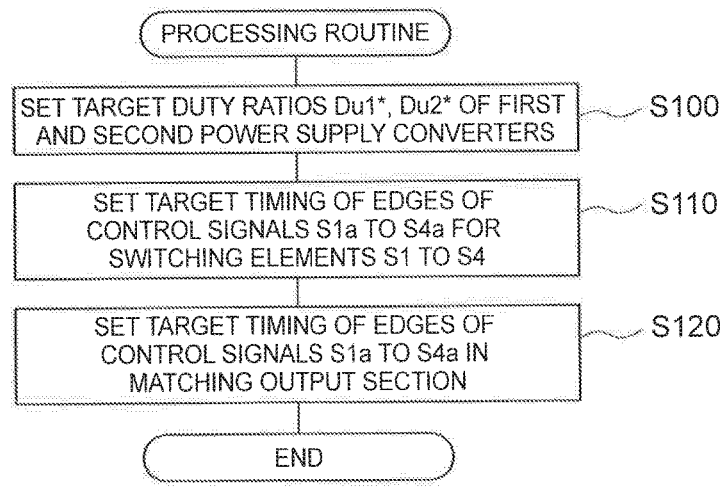
FIG. 8 is a flowchart that shows one example of a processing routine executed by an electronic control unit 60 of the first embodiment.

Next, a description will be made on the switching control of the switches S1 to S4 in the power supply apparatus 20 of the first embodiment. Similar to the comparative example, in the first embodiment, the sawtooth wave is used as the carrier wave Ca1, and the reverse-sawtooth wave that is in the same cycle as the carrier wave Ca1 and whose reset timing matches that of the carrier wave Ca1 is used as the carrier wave Ca2. FIG. 8 is a flowchart that shows one example of a processing routine executed by the electronic control unit 60 of the first embodiment. This routine is executed when the voltage VH of the power line 14 from the voltage sensor 16a and the current IL2 flowing through the reactor L2 from the current sensor 42 are obtained in the current cycle of the carrier waves Ca1, Ca2.

Once the processing routine in FIG. 8 is executed, the electronic control unit 60 first sets the target duty ratios Du1*, Du2* of the first and second power supply converters in the next cycle of the carrier waves Ca1, Ca2 (step S100). This processing can be executed in a similar manner to that in the above-described comparative example.

Next, based on the target duty ratios Du1*, Du2* of the first and second power supply converters in the next cycle of the carrier waves Ca1, Ca2, target timing of each of edges (rise and fall) of the control signals S1a to S4a for the switches S1 to S4 in the cycle are separately set (step S110). FIG. 9 is an explanatory table that shows the target timing of each of the edges of the control signals S1a to S4a for the switches S1 to S4 in the next cycle of the carrier waves Ca1, Ca2. "Tw", "τd1", and "τd2" in FIG. 9 have been described above. "τdt" is the dead time. As shown in FIG. 9, the target timing of each of the edges of the control signals S1a to S4a differ among a case where a sum of the target duty ratio Du1* and the target duty ratio Du2* is smaller than a value 1, a case where the sum of the target duty ratio Du1* and the target duty ratio Du2* is larger than the value 1, and a case where the sum of the target duty ratio Du1* and the target duty ratio Du2* is equal to the value 1.

In FIG. 9, in the case where the sum of the target duty ratio Du1* and the target duty ratio Du2* is smaller than the value 1, the target timing of each of the edges of the control signals S1a to S4a are set as will be described below. Because the switch S1 is kept ON, the target timing of the edges is not set for the control signal S1a for the switch S1. For the control signal S2a for the switch S2, time (Tw+τd1+τdt) is set as target rise timing, and the time (Tw+τw) is set as target fall timing. For the control signal S3a for the switch S3, time (τw+τd1) is set as target fall timing, and time (Tw+τw−τd2+τdt) is set as target rise timing. For the control signal S4a for the switch S4, the time (Tw+τw−τd2) is set as target fall timing, and time (Tw+τw+τdt) is set as target rise timing.

In addition, in FIG. 9, in the case where the sum of the target duty ratio Du1* and the target duty ratio Du2* is larger than the value 1, the target timing of each of the edges of the control signals S1a to S4a is set as will be described below. For the control signal S1a for the switch S1, the time (Tw+τw−τd2) is set as the target fall timing, and the time (Tw+τd1+τdt) is set as the target rise timing. For the control signal S2a for the switch S2, the time (Tw+τw−τd2+τdt) is set as the target rise timing, and the time (Tw+τw) is set as the target fall timing. Because the switch S3 is kept ON, the target timing of the edges is not set for the control signal S3a for the switch S3. For the control signal S4a for the switch S4, the time (Tw+τd1) is set as the target fall timing, and time (Tw+τw+τdt) is set as the target rise timing.

Furthermore, in FIG. 9, in the case where the sum of the target duty ratio Du1* and the target duty ratio Du2* is equal to the value 1, the target timing of each of the edges of the control signals S1a to S4a is set as will be described below. Because the switch S1 is kept ON, the target timing of the edges is not set for the control signal S1a for the switch S1. For the control signal S2a for the switch S2, the time (Tw+τd1+τdt) is set as the target rise timing, and the time (Tw+τw) is set as the target fall timing. Because the switch S3 is kept ON, the target timing of the edges is not set for the control signal S3a for the switch S3. For the control signal S4a for the switch S4, the time (Tw+τw−τd2) is set as the target fall timing, and the time (Tw+τw+τdt) is set as the target rise timing.

As described above, the target timing of each of the edges of the control signals S1a to S4a for the switches S1 to S4 in the next cycle of the carrier waves Ca1, Ca2 can appropriately be set in accordance with magnitude relationships between the sum of the target duty ratio Du1* and the target duty ratio Du2* and the value 1. Noted that, in any case, the time (Tw+τw+τdt) is not time in the next cycle of the carrier waves Ca1, Ca2; however, the time (Tw+τw+τdt) is time obtained by adding the dead time τdt to the time (Tw+τw) and thus is treated as the time in the next cycle of the carrier waves Ca1, Ca2 in the first embodiment.

Then, the target timing of each of the edges of the control signals S1a to S4a for the switches S1 to S4 in the next cycle of the carrier waves Ca1, Ca2 is set in the matching output section (step S120), and this routine is terminated. Thereafter, when the timekeeping value of the timer reaches the target timing of each of the edges of the control signals S1a to S4a, output of the corresponding control signal is switched from OFF (Low) to ON (High) or from ON to OFF.

Here, the processing in above-described step S110 will be described. The case where the sum of the target duty ratio Du1* and the target duty ratio Du2* is smaller than the value 1 is considered. In this case, as it is understood from FIG. 7 that has been used for the description of the comparative example, some of the control signals S1x to S4x for the switches S1 to S4 are switched between ON and OFF at each of three of time (the timing) of the time (Tw+τd1), the time (Tw+τw−τd2), and the time (Tw+τw) in the next cycle of the carrier waves Ca1, Ca2. The details thereon are as will be described below. At the time (Tw−τd1), the control signal S2x for the switch S2 is switched from OFF to ON, and the control signal S3x for the switch S3 is switched from ON to OFF. In addition, at the time (Tw+τw−τd2), the control signal S3x for the switch S3 is switched from OFF to ON, and the control signal S4x for the switch S4 is switched from ON to OFF. Furthermore, at the time (Tw+τw), the control signal S2x for the switch S2 is switched from ON to OFF, and the control signal S4x for the switch S4 is switched from OFF to ON. Based on these, and further in consideration of the dead time τdt, the target timing of each of the edges of the control signals S1a to S4a is defined in FIG. 9. Accordingly, by separately setting the target timing of each of the edges of the control signals S1a to S4a by using FIG. 9, waveforms of the control signals S1a to S4a can conform to waveforms of the control signals S1y to S4y (the control signals obtained by adding the dead time to the control signals S1x to S4x) in the comparative example. For example, regarding the control signal S2a for the switch S2, the waveform of the control signal S2a can conform to the waveform of the control signal S2y in the comparative example by setting rise time (Tw+τd1+τdt) of the control signal S2y as the target rise timing of the control signal S2a and setting fall time (Tw+τw) of the control signal S2y as the target fall timing of the control signal S2a. The same idea as that in the case where the sum of the target duty ratio Du1* and the target duty ratio Du2* is smaller than the value 1 can be applied to the case where the sum of the target duty ratio Du1* and the target duty ratio Du2* is larger than the value 1 and the case where the sum of the target duty ratio Du1* and the target duty ratio Du2* is equal to the value 1.

By adopting the method as described above, the switching control of the switches S1 to S4 can be executed by outputting the control signals S1a to S4a that conform to the control signals S1y to S4y in the comparative example to the switches S1 to S4 without providing the logic circuit and sequentially performing the logical operations that correspond to the processing in the logic circuit, and further without providing the dead time generation circuit. As a result, compared to a power supply apparatus that is provided with the logic circuit and the dead time generation circuit, the number of components of the power supply apparatus 20 can be reduced. In addition, compared to a power supply apparatus in which an electronic control unit sequentially performs the logical operations, a processing load of the electronic control unit 60 can be reduced.

Noted that, in the case where the reset timing of the carrier waves Ca1, Ca2 do not match each other, the target timing of each of the edges of the control signals S1a to S4a has to be set separately in accordance with four of the timing in the next cycle of the carrier wave Ca1. On the contrary, because the reset timing of the carrier waves Ca1, Ca2 match each other in the first embodiment, the target timing of each of the edges of the control signals S1a to S4a only has to be set separately in accordance with three of the timing in the next cycle of the carrier wave Ca1.

Figure 10:
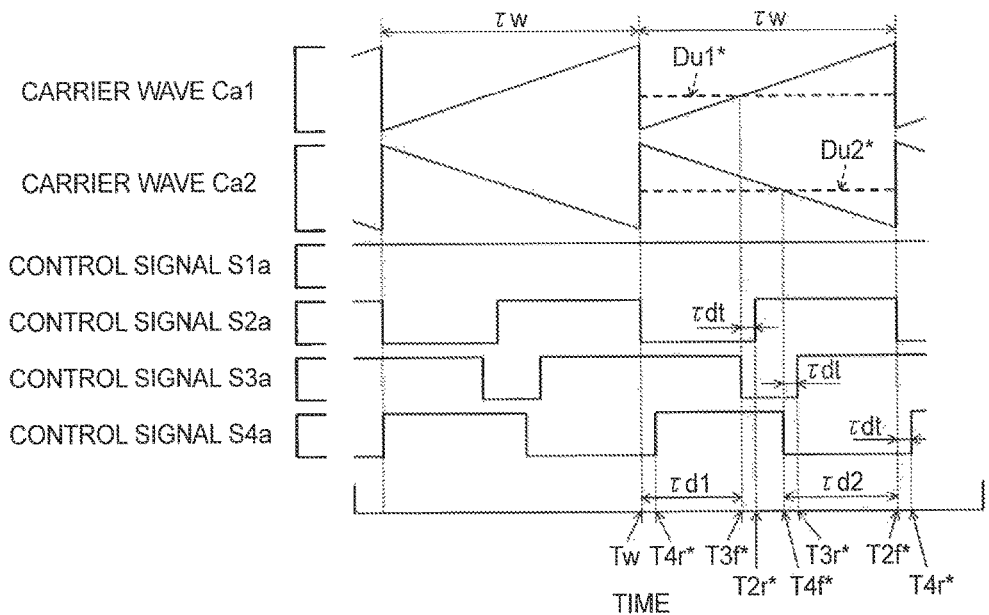
FIG. 10 is an explanatory view that shows one example of a timing chart in the power supply apparatus 20 of the first embodiment.

FIG. 10 is an explanatory view that shows one example of a timing chart in the power supply apparatus 20 of the first embodiment. Differing from the comparative example, the control signals B1U, B1L, B2U, B2L for the upper and lower arms of the first and second power supply converters are not generated in the first embodiment. Thus, these are not shown in FIG. 10. In addition, FIG. 10 shows the case where the sum of the target duty ratio Du1* and the target duty ratio Du2* is smaller than the value 1. Furthermore, in FIG. 10, time T2r*, T2f* respectively indicate the target rise and fall timing (Tw+τd1+τdt), (Tw+τw) of the control signal S2a for the switch S2. Time T3f*, T3r* respectively indicate the target fall and rise timing (Tw+τd1), (Tw+τw−τd2+τdt) of the control signal S3a for the switch S3. Time T4f*, T4r* respectively indicate the target fall and rise timing (Tw+τw−τd2), (Tw+τw+τdt) of the control signal S4a for the switch S4. In the first embodiment, the target timing of each of the edges of the control signals S2a to S4a in the next cycle of the carrier waves Ca1, Ca2 is separately set in the current cycle of the carrier waves Ca1, Ca2 and is set in the matching output section. In this way, the switching control of the switches S1 to S4 can be executed by outputting the control signals S1a to S4a that conform to the control signals S1y to S4y in the comparative example to the switches S1 to S4 in the next cycle of the carrier waves Ca1, Ca2.

In the power supply apparatus 20 of the first embodiment that has been described so far, the electronic control unit 60 separately sets the target timing of each of the edges of the control signals S1a to S4a for the switches S1 to S4 in the next cycle of the carrier waves Ca1, Ca2 in accordance with three of the timing in the cycle that are the timing at which the carrier wave Ca1 and the target duty ratio Du1* become equal to each other during the increase of the carrier wave Ca1, the timing at which the carrier wave Ca2 and the target duty ratio Du2* become equal to each other during the decrease of the carrier wave Ca2, and the reset timing of the carrier waves Ca1, Ca2. Then, the electronic control unit 60 sets each of the target timing in the matching output section, and, when the timekeeping value of the timer reaches the target timing of each of the edges of the control signals S1a to S4a, switches the output of the corresponding control signal from OFF (Low) to ON (High) or from ON to OFF. In this way, the switching control of the switches S1 to S4 can be executed without providing the logic circuit and sequentially performing the logical operations that correspond to the processing in the logic circuit. As a result, compared to the power supply apparatus that is provided with the logic circuit, the number of the components of the power supply apparatus 20 can be reduced. In addition, compared to the power supply apparatus in which the electronic control unit sequentially performs the logical operations, the processing load of the electronic control unit 60 can be reduced.

In addition, in the power supply apparatus 20 of the first embodiment, the electronic control unit 60 separately sets the target timing of each of the edges of the control signals S1a to S4a for the switches S1 to S4 in the next cycle of the carrier waves Ca1, Ca2 in consideration of the dead time. In this way, because the dead time generation circuit does not have to be provided between the electronic control unit 60 and the switches S1 to S4, the number of the components of the power supply apparatus 20 can further be reduced.

In the power supply apparatus 20 of the first embodiment, the electronic control unit 60 separately sets the target timing of each of the edges of the control signals S1a to S4a for the switches S1 to S4 in the next cycle of the carrier waves Ca1, Ca2 based on the target duty ratios Du1*, Du2* of the first and second power supply converters in the cycle. However, the electronic control unit 60 may separately set the target timing of each of the edges of the control signals S1a to S4a for the switches S1 to S4 in the next cycle of the carrier waves Ca1, Ca2 based on timing of each of edges of the control signals B1U, B1L, B2U, B2L for the upper and lower arms of the first and second power supply converters in the cycle. One example of a processing routine in this case is shown in FIG. 11.

Figure 11:
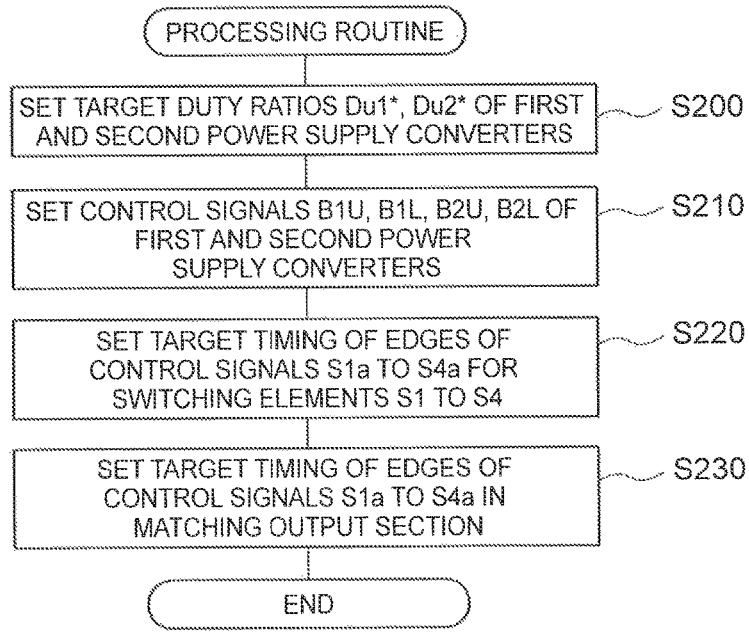
FIG. 11 is a flowchart that shows one example of a processing routine of a modified example in accordance with disclosed embodiments.

Once the processing routine in FIG. 11 is executed, the electronic control unit 60 first sets the target duty ratios Du1*, Du2* of the first and second power supply converters in the next cycle of the carrier waves Ca1, Ca2 (step S200). This processing can be executed in a similar manner to the processing in the above-described comparative example and the processing in step S100 of the processing routine in FIG. 8.

Next, the control signals B1U, B1L, B2U, B2L for the upper and lower arms of the first and second power supply converters in the next cycle of the carrier waves Ca1, Ca2 are generated on the basis of the target duty ratios Du1*, Du2* of the first and second power supply converters in the next cycle of the carrier waves Ca1, Ca2 (step S210). This processing can be executed in a similar manner to the processing in the above-described comparative example.

Then, based on the timing of each of the edges (rise and fall) of the control signals B1U, B1L, B2U, B2L in the next cycle of the carrier waves Ca1, Ca2, the target timing of each of the edges of the control signals S1a to S4a for the switches S1 to S4 in the cycle is separately set (step S220). Similar to the processing in step S110 of the processing routine in FIG. 8, this processing can be executed by using FIG. 9. As it is understood from FIG. 7, in the next cycle of the carrier waves Ca1, Ca2, the control signals B1U, B1L for the upper and lower arms of the first power supply converter are switched between ON and OFF at the time (Tw+τd1) and the time (Tw+τw), and the control signals B2U, B2L for the upper and lower arms of the second power supply converter are switched between ON and OFF at the time (Tw+τw−τd2) and the time (Tw+τw). Then, some of the control signals S1x to S4x for the switches S1 to S4 are switched between ON and OFF at each of the three of the time (the timing) that are the time (Tw+τd1), the time (Tw+τw−τd2), and the time (Tw+τw). Thus, in consideration of relationships between the timing of the edges of the control signals B1U, B1L, B2U, B2L and the timing of the edges of the control signals S1x to S4x, it is considered that the waveforms of the control signals S1a to S4a can conform to the waveforms of the control signals S1y to S4y (the control signals obtained by adding the dead time to the control signals S1x to S4x) in the comparative example by executing the processing in step S220 in a similar manner to the processing in step S110 of the processing routine in FIG. 8.

Then, the target timing of each of the edges of the control signals S1a to S4a for the switches S1 to S4 in the next cycle of the carrier waves Ca1, Ca2 is set in the matching output section (step S230), and this routine is terminated. This processing can be executed in a similar manner to the processing in step S120 of the processing routine in FIG. 8.

By adopting the method as described above, similar to the first embodiment, the switching control of the switches S1 to S4 can be executed without providing the logic circuit and sequentially performing the logical operations that correspond to the processing in the logic circuit.

In the power supply apparatus 20 of the first embodiment, the electronic control unit 60 separately sets the target timing of each of the edges of the control signals S1a to S4a for the switches S1 to S4 in the next cycle of the carrier waves Ca1, Ca2 in consideration of the dead time. However, the target timing of each of the edges of the control signals S1a to S4a for the switches S1 to S4 in the next cycle of the carrier waves Ca1, Ca2 may separately be set without considering the dead time. In this case, the dead time generation circuit has to be provided between the electronic control unit 60 and the switches S1 to S4. However, similar to the first embodiment, the switching control of the switches S1 to S4 can be executed without providing the logic circuit and sequentially performing the logical operations that correspond to the processing in the logic circuit.

In the power supply apparatus 20 of the first embodiment, the sawtooth wave is used as the carrier wave Ca1, and the reverse-sawtooth wave is used as the carrier wave Ca2. However, the reverse-sawtooth wave may be used as the carrier wave Ca1, and the sawtooth wave may be used as the carrier wave Ca2. Alternatively, the sawtooth waves may be used as the carrier waves Ca1, Ca2, or the reverse-sawtooth waves may be used as the carrier waves Ca1, Ca2. FIG. 12 is an explanatory table that shows the target timing of each of the edges of the control signals S1a to S4a for the switches S1 to S4 in the next cycle of the carrier waves Ca1, Ca2 in the case where the reverse-sawtooth wave is used as the carrier wave Ca1 and the sawtooth wave is used as the carrier wave Ca2. FIG. 13 is an explanatory table that shows the target timing of each of the edges of the control signals S1a to S4a for the switches S1 to S4 in the next cycle of the carrier waves Ca1, Ca2 in the case where the sawtooth waves are used as the carrier waves Ca1, Ca2. FIG. 14 is an explanatory table that shows the target timing of each of the edges of the control signals S1a to S4a for the switches S1 to S4 in the next cycle of the carrier waves Ca1, Ca2 in the case where the reverse-sawtooth waves are used as the carrier waves Ca1, Ca2. Hereinafter, a description thereon will sequentially be made.

In FIG. 12, in the case where the sum of the target duty ratio Du1* and the target duty ratio Du2* is smaller than the value 1, the target timing of each of the edges of the control signals S1a to S4a for the switches S1 to S4 is set as will be described below. Because the switch S1 is kept ON, the target timing of the edges is not set for the control signal S1a for the switch S1. For the control signal S2a for the switch S2, time (Tw+τw−τd1) is set as the target fall timing, and the time (Tw+τw+τdt) is set as the target rise timing. For the control signal S3a for the switch S3, time (Tw+τd2) is set as the target fall timing, and time (Tw+τw−τd1+τdt) is set as the target rise timing. For the control signal S4a for the switch S4, time (Tw+τd2+τdt) is set as the target rise timing, and the time (Tw+τw) is set as the target fall timing.

In addition, in FIG. 12, in the case where the sum of the target duty ratio Du1* and the target duty ratio Du2* is larger than the value 1, the target timing of each of the edges of the control signals S1a to S4a for the switches S1 to S4 is set as will be described below. For the control signal S1a for the switch S1, the time (Tw+τw−τd1) is set as the target fall timing, and the time (Tw+τd2+τdt) is set as the target rise timing. For the control signal S2a for the switch S2, the time (Tw+τd2) is set as the target fall timing, and the time (Tw+τw+τdt) is set as the target rise timing. Because the switch S3 is kept ON, the target timing of the edges is not set for the control signal S3a for the switch S3. For the control signal S4a for the switch S4, the time (Tw+τw−τd1−τdt) is set as the target rise timing, and the time (Tw+τw) is set as the target fall timing.

Furthermore, in FIG. 12, in the case where the sum of the target duty ratio Du1* and the target duty ratio Du2* is equal to the value 1, the target timing of each of the edges of the control signals S1a to S4a for the switches S1 to S4 is set as will be described below. Because the switch S1 is kept ON, the target timing of the edges is not set for the control signal S1a for the switch S1. For the control signal S2a for the switch S2, the time (Tw+τd2) is set as the target tall timing, and the time (Tw+τw+τdt) is set as the target rise timing. Because the switch S3 is kept ON, the target timing of the edges is not set for the control signal S3a for the switch S3. For the control signal S4a for the switch S4, the time (Tw+τw−τd1+τdt) is set as the target rise timing, and the time (Tw+τw) is set as the target fall timing.

In FIG. 13, in the case where the target duty ratio Du1* is smaller than the target duty ratio Du2*, the target timing of each of the edges of the control signals S1a to S4a for the switches S1 to S4 is set as will be described below. For the control signal S1a for the switch S1, the time (Tw+τd1+τdt) is set as the target rise timing, and the time (Tw+τw) is set as the target fall timing. Because the switch S2 is kept ON, the target timing of the edges is not set for the control signal S2a for the switch S2. For the control signal S3a for the switch S3, the time (Tw+τd2) is set as the target fall timing, and the time (Tw+τw+τdt) is set as the target rise timing. For the control signal S4a for the switch S4, the time (Tw+τd1) is set as the target fall timing, and the time (Tw+τd2+τdt) is set as the target rise timing.

In addition, in FIG. 13, in the case where the target duty ratio Du1* is larger than the target duty ratio Du2*, the target timing of each of the edges of the control signals S1a to S4a for the switches S1 to S4 is set as will be described below. For the control signal S1a for the switch S1, the time (Tw+τd2+τdt) is set as the target rise timing, and the time (Tw+τw) is set as the target fall timing. For the control signal S2a for the switch S2, the time (Tw+τd2) is set as the target fall timing, and the time (Tw+τd1+τdt) is set as the target rise timing. For the control signal S3a for the switch S3, the time (Tw+τd1) is set as the target fall timing, and the time (Tw+τw+τdt) is set as the target rise timing. Because the switch S4 is kept ON, the target timing of the edges is not set for the control signal S4a for the switch S4.

Furthermore, in FIG. 13, in the case where the target duty ratio Du1* is equal to the target duty ratio Du2*, the target timing of each of the edges of the control signals S1a to S4a for the switches S1 to S4 is set as will be described below. For the control signal S1a for the switch S1, the time (Tw+τd2+τdt) is set as the target rise timing, and the time (Tw+τw) is set as the target fall timing. Because the switch S2 is kept ON, the target timing of the edges is not set for the control signal S2a for the switch S2. For the control signal S3a for the switch S3, the time (Tw+τd1) is set as the target fall timing, and the time (Tw+τw+τdt) is set as the target rise timing. Because the switch S4 is kept ON, the target timing of the edges is not set for the control signal S4a for the switch S4.

In FIG. 14, in the case where the target duty ratio Du1* is smaller than the target duty ratio Du2*, the target timing of each of the edges of the control signals S1a to S4a for the switches S1 to S4 is set as will be described below. For the control signal S1a for the switch S1, the time (Tw+τw−τd1) is set as the target fall timing, and the time (Tw+τw) is set as the target rise timing. Because the switch S2 is kept ON, the target timing of the edges is not set for the control signal S2a for the switch S2. For the control signal S3a for the switch S3, the time (Tw+τw−τd2+τdt) is set as the target rise timing, and the time (Tw+τw) is set as the target fall timing. For the control signal S4a for the switch S4, the time (Tw+τw−τd2) is set as the target fall timing, and the time (Tw+τw−τd1+τdt) is set as the target rise timing.

In addition, in FIG. 14, in the case where the target duty ratio Du1* is larger than the target duty ratio Du2*, the target timing of each of the edges of the control signals S1a to S4a for the switches S1 to S4 is set as will be described below. For the control signal S1a for the switch S1, the time (Tw+τw−τd2) is set as the target fall timing, and the time (Tw+τw) is set as the target rise timing. For the control signal S2a for the switch S2, the time (Tw+τw−τd1) is set as the target fall timing, and the time (Tw+τw−τd2+τdt) is set as the target rise timing. For the control signal S3a for the switch S3, the time (Tw+τw−τd1+τdt) is set as the target rise timing, and the time (Tw+τw) is set as the target fall timing. Because the switch S4 is kept ON, the target timing of the edges is not set for the control signal S4a for the switch S4.

Furthermore, in FIG. 14, in the case where the target duty ratio Du1* is equal to the target duty ratio Du2*, the target timing of each of the edges of the control signals S1a to S4a for the switches S1 to S4 is set as will be described below. For the control signal S1a for the switch S1, the time (Tw+τw−τd2) is set as the target fall timing, and the time (Tw+τw) is set as the target rise timing. Because the switch S2 is kept ON, the target timing of the edges is not set for the control signal S2a for the switch S2. For the control signal S3a for the switch S3, the time (Tw+τw−τd1+τdt) is set as the target rise timing, and the time (Tw+τw) is set as the target fall timing. Because the switch S4 is kept ON, the target timing of the edges is not set for the control signal S4a for the switch S4.

As in these descriptions, the target timing of each of the edges of the control signals S1a to S4a for the switches S1 to S4 in the next cycle of the carrier waves Ca1, Ca2 is separately set by using FIG. 12 to FIG. 14, respectively, in the case where the reverse-sawtooth wave is used as the carrier wave Ca1 and the sawtooth wave is used as the carrier wave Ca2, in the case where the sawtooth waves are used as the carrier waves Ca1, Ca2, and in the case where the reverse-sawtooth waves are used as the carrier waves Ca1, Ca2. In this way, similar to the first embodiment, the switching control of the switches S1 to S4 can be executed without providing the logic circuit and sequentially performing the logical operations that correspond to the processing in the logical circuit.

In the power supply apparatus 20 of the first embodiment and the modified example thereof, the sawtooth wave(s) and/or the reverse-sawtooth wave(s) that are in the same cycle and whose reset timing match each other are used as the carrier waves Ca1, Ca2. However, the sawtooth wave(s)

and/or the reverse-sawtooth wave(s), whose reset timing differ from each other, may be used as the carrier waves Ca1, Ca2 as long as they are in the same cycle. In this case, the target timing of each of the edges of the control signals S1a to S4a only has to be separately set in accordance with the four of the timing in the one cycle of the carrier waves Ca1, Ca2.

In the power supply apparatus 20 of the first embodiment and the modified example thereof, the sawtooth wave(s) and/or the reverse-sawtooth wave(s) that are in the same cycle are used as the carrier waves Ca1, Ca2. However, triangle waves that are in the same cycle may be used as the carrier waves Ca1, Ca2. In this case, the target timing of each of the edges of the control signals S1a to S4a only has to be separately set in accordance with four of the timing in the one cycle of the carrier waves Ca1, Ca2. Noted that the four of the timing are timing at which the carrier wave Ca1 and the target duty ratio Du1* become equal to each other during the increase and a decrease of the carrier wave Ca1 and timing at which the carrier wave Ca2 and the target duty ratio Du2* become equal to each other during an increase and the decrease of the carrier wave Ca2.

Figure 15:
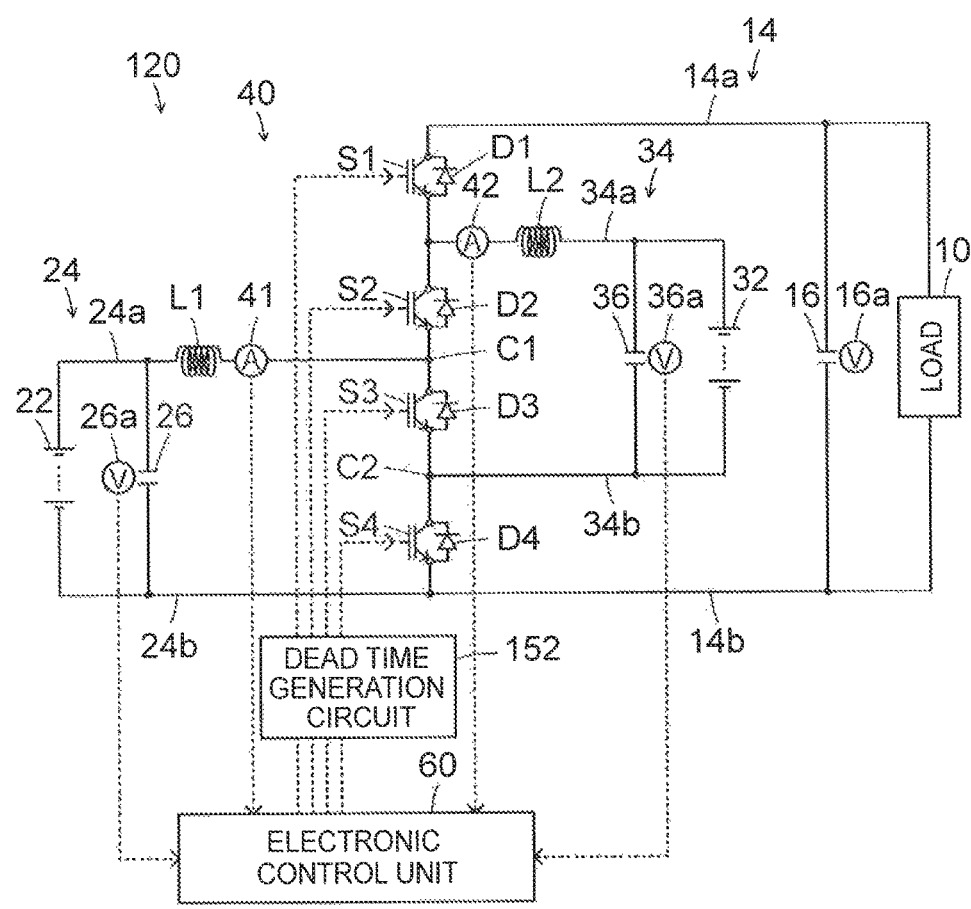
FIG. 15 is a configuration diagram that schematically shows a configuration of a power supply apparatus 120 of a second embodiment in accordance with disclosed embodiments.

FIG. 15 is a configuration diagram that schematically shows a configuration of a power supply apparatus 120 of a second embodiment. The power supply apparatus 120 of the second embodiment has the same hardware configuration as the power supply apparatus 20 of the first embodiment except for a point that the power supply apparatus 120 includes a dead time generation circuit 152 between the electronic control unit 60 and the switches S1 to S4. Accordingly, in order to avoid an overlapping description, the hardware configuration of the power supply apparatus 120 of the second embodiment that is the same as the hardware configuration of the power supply apparatus 20 of the first embodiment is denoted by the same reference numerals, and a description thereon will not be made. The dead time generation circuit 152 is similar to the dead time generation circuit that has been described in the above-described comparative example, generates control signals S1b to S4b by adding the dead time to each of the control signals S1a to S4a for the switches S1 to S4 that are transmitted from the electronic control unit 60, and outputs these control signals S1b to S4b to the switches S1 to S4.

Figures 16, 17:
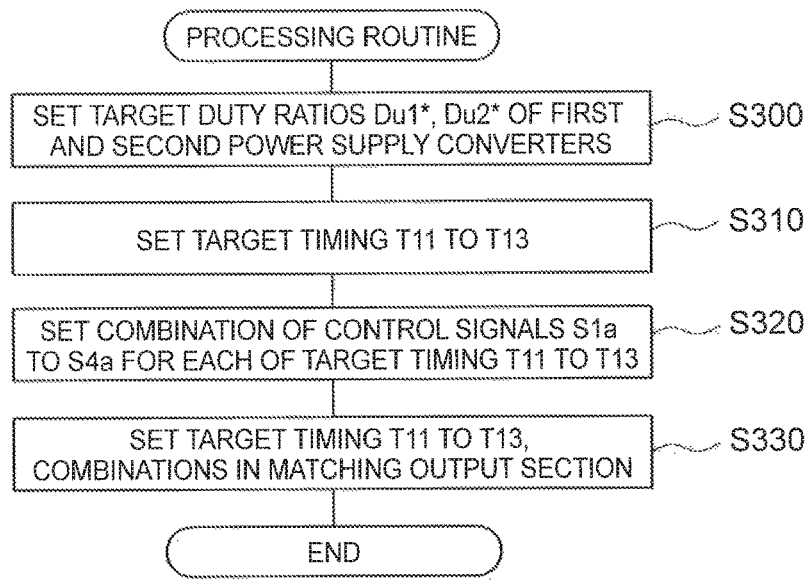
FIG. 16 is a flowchart that shows one example of a processing routine executed by the electronic control unit 60 of the second embodiment in accordance with disclosed embodiments.
FIG. 17 is an explanatory table that shows target timing T11 to T13 in the next cycle of the carrier waves Ca1, Ca2 and a combination of the control signals S1a to S4a for the switches S1 to S4 at each of the target timing T11 to T13 in accordance with disclosed embodiments.

Next, a description will be made on the switching control of the switches S1 to S4 in the power supply apparatus 120 of the second embodiment. In the second embodiment, similar to the first embodiment, the sawtooth wave is used as the carrier wave Ca1, and the reverse-sawtooth wave that is in the same cycle as the carrier wave Ca1 and whose reset timing matches that of the carrier wave Ca1 is used as the carrier wave Ca2. FIG. 16 is a flowchart that shows one example of a processing routine executed by the electronic control unit 60 of the second embodiment. This routine is executed at the same timing as the processing routine in FIG. 8.

Once the processing routine in FIG. 16 is executed, the electronic control unit 60 first sets the target duty ratios Du1*, Du2* of the first and second power supply converters in the next cycle of the carrier waves Ca1, Ca2 (step S300). This processing can be executed in a similar manner to the processing in step S1100 of the processing routine in FIG. 8.

Next, based on the target duty ratios Du1*, Du2* of the first and second power supply converters in the next cycle of the carrier waves Ca1, Ca2, target timing T11 to T13 (T11<T12<T13) in the cycle are set (step S310), and a combination of the control signals S1a to S4a for the switches S1 to S4 is set for each of the target timing T11 to T13 (step S320). FIG. 17 is an explanatory table that shows the target timing T11 to T13 in the next cycle of the carrier waves Ca1, Ca2 and the combination of the control signals S1a to S4a for the switches S1 to S4 at each of the target timing T11 to T13. As shown in FIG. 17, the target timing T11 to T13 and the combination of the control signals S1a to S4a for each of the target timing T11 to T13 differ among the case where the sum of the target duty ratio Du1* and the target duty ratio Du2* is smaller than the value 1, the case where the sum of the target duty ratio Du1* and the target duty ratio Du2* is larger than the value 1, and the case where the sum of the target duty ratio Du1* and the target duty ratio Du2* is equal to the value 1.

In FIG. 17, in the case where the sum of the target duty ratio Du1* and the target duty ratio Du2* is smaller than the value 1, the time (Tw+τd1), (Tw+τw−τd2), (Tw+τw) are respectively set as the target timing T11, T12, T13. This is because the time (Tw+τd1) becomes earlier time than the time (Tw+τw−τd2). In addition, for the target timing T11, (1, 1, 0, 1) is set as the combination of the control signals S1a, S2a, S3a, S4a. For the target timing T12, (1, 1, 1, 0) is set as the combination of the control signals S1a, S2a, S3a, S4a. For the target timing T13, (1, 0, 1, 1) is set as the combination of the control signals S1a, S2a, S3a, S4a.

In addition, in FIG. 17, in the case where the sum of the target duty ratio Du1* and the target duty ratio Du2* is larger than the value 1, the time (Tw+τw−τd2), (Tw+τd1), (Tw+τw) are respectively set as the target timing T11, T12, T13. This is because the time (Tw+τd1) becomes later time than the time (Tw+τw−τd2). In addition, for the target timing T11, (0, 1, 1, 1) is set as the combination of the control signals S1a, S2a, S3a, S4a. For the target timing T12, (1, 1, 1, 0) is set as the combination of the control signals S1a, S2a, S3a, S4a. For the target timing T13, (1, 0, 1, 1) is set as the combination of the control signals S1a, S2a, S3a, S4a.

Furthermore, in FIG. 17, in the case where the sum of the target duty ratio Du1* and the target duty ratio Du2* is equal to the value 1, the time (Tw+τd1)=(Tw+τw−τd2), (Tw+τw) are respectively set as the target timing T11=T12, T13. This is because the time (Tw+τd1) and the time (Tw+τw−τd2) become the same time. In addition, for the target timing T11, T12, (1, 1, 1, 0) is set as the combination of the control signals S1a, S2a, S3a, S4a. For the target timing 13, (1, 0, 1, 1) is set as the combination of the control signals S1a, S2a, S3a, S4a.

As described above, the target timing T11 to T13 and the combination of the control signals S1a to S4a for the switches S1 to S4 for each of the target timing T11 to T13 can appropriately be set in accordance with the magnitude relationships between the sum of the target duty ratio Du1* and the target duty ratio Du2* and the value 1.

Figure 18:
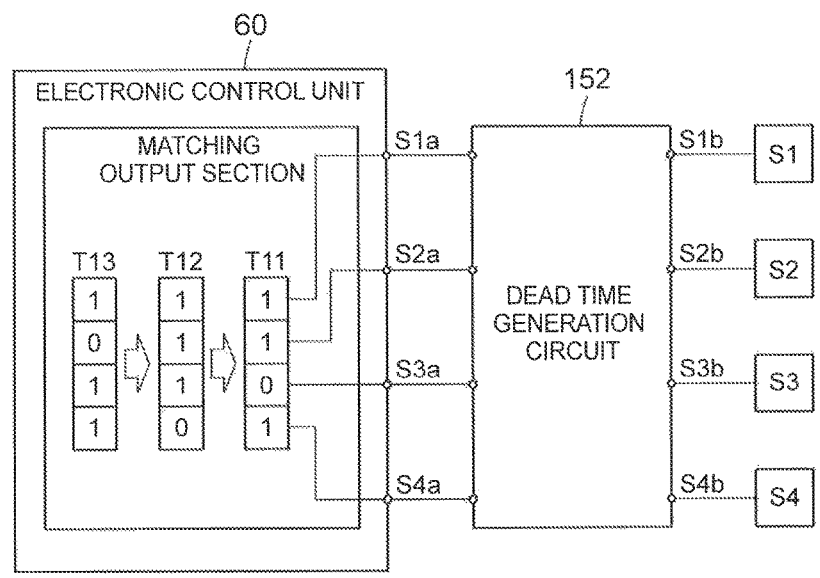
FIG. 18 is an explanatory view that shows a situation where the combinations of the control signals S1a to S4a are set in a matching output section in the case where a sum of a target duty ratio Du1* and a target duty ratio Du2* is smaller than a value 1 in accordance with disclosed embodiments.

Then, the target timing T11 to T13 and the combinations of the control signals S1a to S4a for the switches S1 to S4 for each of the target timing T11 to T13 in the next cycle of the carrier waves Ca1, Ca2 are set in the matching output section (step S330), and this routine is terminated. A situation where the combinations of the control signals S1a to S4a are set in the matching output section in the case where the sum of the target duty ratio Du1* and the target duty ratio Du2* is smaller than the value 1 is shown in FIG. 18. Just as described, the combinations of the control signals S1a to S4a are set in the matching output section. Thereafter, when the timekeeping value of the timer reaches each of the target timing T11 to T13, the corresponding combination of the control signals S1a to S4a is output. In a case of FIG. 18, first, when the timekeeping value reaches the time T11, the combination (1, 1, 0, 1) of the control signals S1a, S2a, S3a, S4a is output to the dead time generation circuit 152. When the timekeeping value reaches the time T12, the combination (1, 1, 1, 0) of the control signals S1a, S2a, S3a, S4a is output to the dead time generation circuit 152. When the timekeeping value reaches the time T13, the combination (1, 0, 1, 1) of the control signals S1a, S2a, S3a. S4a is output to the dead time generation circuit 152. In the case where the value is 0→0 or 1→1, a keeping command of OFF (Low) or ON (High) is output to the dead time generation circuit 152. In the case where the value is 0→1 or 1→0, a switching command from OFF to ON or from ON to OFF is output to the dead time generation circuit 152. As described above, the dead time generation circuit 152 generates the control signals S1b to S4b for the switches S1 to S4 by adding the dead time to each of the control signals S1a to S4a for the switches S1 to S4 that are transmitted from the electronic control unit 60 and outputs these control signals S1b to S4b to the switches S11 to S4.

Here, a description will be made on the processing in above-described steps S310, S320. The case where the sum of the target duty ratio Du1* and the target duty ratio Du2* is smaller than the value 1 is considered. In this case, as it is understood from FIG. 7, some of the control signals S1x to S4x for the switches S1 to S4 are switched between ON and OFF at each of the three of the time (the timing) that are the time (Tw+τd1), the time (Tw+τw−τd2), and the time (Tw+τw) in the next cycle of the carrier waves Ca1, Ca2. The details thereon are as will be described below. At the time (Tw+τd1), the control signal S2x for the switch S2 is switched from OFF to ON, and the control signal S3x for the switch S3 is switched from ON to OFF. In addition, at the time (Tw+τw−τd2), the control signal S3x for the switch S3 is switched from OFF to ON, and the control signal S4x for the switch S4 is switched from ON to OFF. Furthermore, at the time (Tw+τw), the control signal S2x for the switch S2 is switched from ON to OFF, and the control signal S4x for the switch S4 is switched from OFF to ON. Based on these, the combination of the control signals S1a to S4a for each of the time (Tw+τd1), (Tw+τw−τd2), (Tw+τw) is defined in FIG. 17. Accordingly, by setting the time (Tw+τd1), (Tw+Tw−τd2), (Tw+τw) as the target timing T11 to T13, respectively, and setting the combination of the control signals S1a to S4a for the switches S1 to S4 for each of the target timing T11 to T13 by using FIG. 17, the waveforms of the control signals S1a to S4a can conform to waveforms of the control signals S1x to S4x in the comparative example. The same as the case where the sum of the target duty ratio Du1* and the target duty ratio Du2* is smaller than the value 1 can be considered for the case where the sum of the target duty ratio Du1* and the target duty ratio Du2* is larger than the value 1 and the case where the sum of the target duty ratio Du1* and the target duty ratio Du2* is equal to the value 1.

By adopting the method as described above, the switching control of the switches S1 to S4 can be executed by outputting the control signals S1a to S4a that conform to the control signals S1x to S4x in the comparative example to the dead time generation circuit 152 and thereby outputting the control signals S1b to S4b that conform to the control signals S1y to S4y in the comparative example to the switches S1 to S4 without providing the logic circuit and sequentially performing the logical operations that correspond to the processing in the logic circuit. As a result, compared to the power supply apparatus that is provided with the logic circuit, the number of components of the power supply apparatus 120 can be reduced. In addition, compared to the power supply apparatus in which the electronic control unit sequentially performs the logical operations, the processing load of the electronic control unit 60 can be reduced.

Noted that, in the case where the reset timing of the carrier waves Ca1, Ca2 do not match each other, it is necessary to set the four of the timing in the next cycle of the carrier wave Ca1 as the target timing and thereby set the combination at each of the target timing. On the contrary, because the reset timing of the carrier waves Ca1, Ca2 match each other in the second embodiment, only the three of the timing in the next cycle of the carrier wave Ca1 have to be set as the target timing, and thereby the combination at each of the target timing is set. Thus, the number of the set combinations can be reduced.

In addition, when the method in the first embodiment and the method in the second embodiment are compared, the method in the second embodiment has such an advantage that the processing load of the electronic control unit 60 can further be reduced, and the method in the first embodiment has such an advantage that there is no need to provide the dead time generation circuit 152 between the electronic control unit 60 and the switches S1 to S4.

Figure 19:
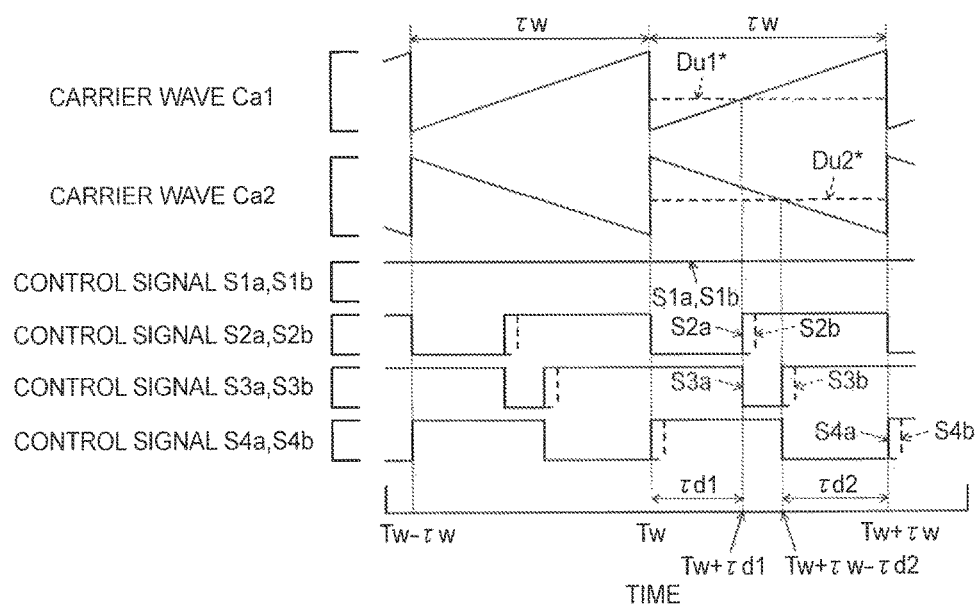
FIG. 19 is an explanatory view that shows one example of a timing chart in the power supply apparatus 120 of the second embodiment in accordance with disclosed embodiments.

FIG. 19 is an explanatory view that shows one example of a timing chart in the power supply apparatus 120 of the second embodiment. FIG. 19 shows the case where the sum of the target duty ratio Du1* and the target duty ratio Du2* is smaller than the value 1. In the second embodiment, in the current cycle of the carrier waves Ca1, Ca2, the time (Tw+τd1), (Tw+τw−τd2), (Tw+τw) in the next cycle of the carrier waves Ca1, Ca2 are set as the target timing T11 to T13, the combinations (1, 1, 0, 1), (1, 1, 1, 0), (1, 0, 1, 1) of the control signals S1a, S2a, S3a, S4a for each of the target timing T11 to T13 are set, and these are set in the matching output section. In this way, the switching control of the switches S1 to S4 can be executed by outputting the control signals S1a to S4a that conform to the control signals S1x to S4x in the comparative example to the dead time generation circuit 152 and thereby outputting the control signals S1b to S4b that conform to the control signals S1y to S4y in the comparative example to the switches S1 to S4 in the next cycle of the carrier waves Ca1, Ca2.

In the power supply apparatus 120 of the second embodiment that has been described so far, the electronic control unit 60 respectively sets the timing at which the carrier wave Ca1 and the target duty ratio Du1* become equal to each other during the increase of the carrier wave Ca1, the timing at which the carrier wave Ca2 and the target duty ratio Du2* become equal to each other during the decrease of the carrier wave Ca2, and the reset timing of the carrier waves Ca1, Ca2 in the next cycle of the carrier waves Ca1, Ca2 as the target timing T11 to T13. Next, the electronic control unit 60 sets the combination of the control signals S1a, S2a, S3a, S4a for the switches S1 to S4 for each of the target timing T11 to T13. Then, the electronic control unit 60 sets the target timing T11 to T13 and the combination of the control signals S1a to S4a for the switches S1 to S4 for each of the target timing T11 to T13 in the matching output section. Thereafter, when the timekeeping value of the timer reaches each of the target timing T11 to T13, the electronic control unit 60 outputs the corresponding combination to the dead time generation circuit 152. The dead time generation circuit 152 generates the control signals S1b to S4b for the switches S1 to S4 by adding the dead time to each of the control signals S1a to S4a for the switches S1 to S4 that are transmitted from the electronic control unit 60, and outputs these control signals S1b to S4b to the switches S1 to S4. In this way, the switching control of the switches S1 to S4 can be executed without providing the logic circuit and sequentially performing the logical operations that correspond to the processing in the logic circuit. As a result, compared to the power supply apparatus that is provided with the logic circuit, the number of the components of the power supply apparatus 120 can be reduced. In addition, compared to the power supply apparatus in which the electronic control unit sequentially performs the logical operations, the processing load of the electronic control unit 60 can be reduced.

In the power supply apparatus 120 of the second embodiment, based on the target duty ratios Du1*, Du2* of the first and second power supply converters in the next cycle of the carrier waves Ca1, Ca2, the electronic control unit 60 sets the target timing T11 to T13 in the cycle. However, the timing of each of the edges of the control signals B1U, B1L, B2U, B2L for the upper and lower arms of the first and second power supply converters in the next cycle of the carrier waves Ca1, Ca2 may be set as the target timing T11 to T13 in the cycle. One example of a processing routine in this case is shown in FIG. 20.

Figures 20, 21:
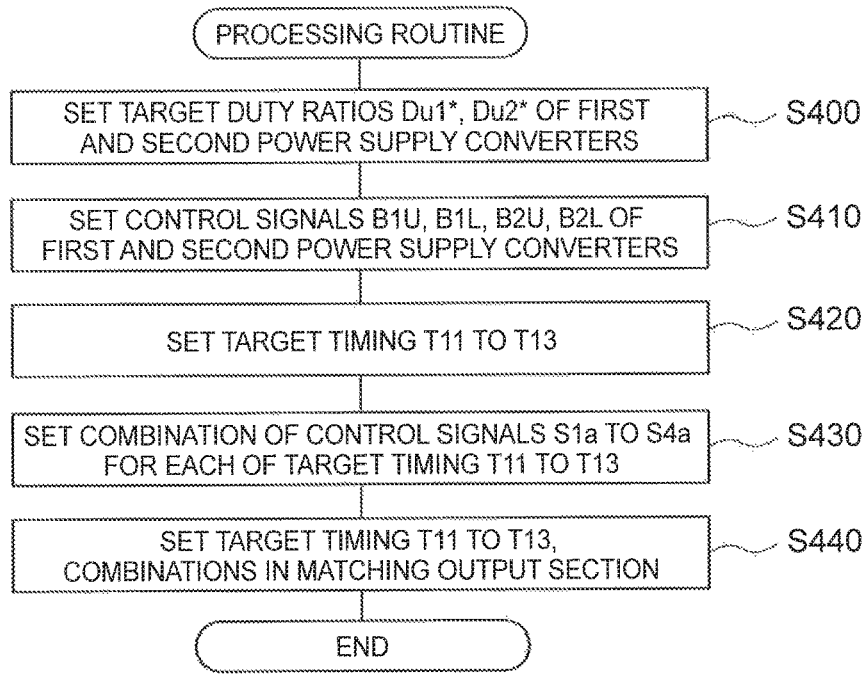
FIG. 20 is a flowchart that shows one example of a processing routine of a modified example in accordance with disclosed embodiments.
FIG. 21 is an explanatory table that shows the target timing T11 to T13 in the next cycle of the carrier waves Ca1, Ca2 of the modified example and a combination of the control signals S1a to S4a for the switches S1 to S4 at each of the target timing T11 to T13 in accordance with disclosed embodiments.

Once the processing routine in FIG. 20 is executed, the electronic control unit 60 first sets the target duty ratios Du1*, Du2* of the first and second power supply converters in the next cycle of the carrier waves Ca1, Ca2 (step S400). This processing can be executed in a similar manner to the processing in step S300 of the processing routine in FIG. 16.

Next, the control signals B1U, B1L, B2U, B2L for the upper and lower arms of the first and second power supply converters in the next cycle of the carrier waves Ca1, Ca2 are generated on the basis of the target duty ratios Du1*, Du2* of the first and second power supply converters in the next cycle of the carrier waves Ca1, Ca2 (step S410). This processing can be executed in a similar manner to the processing in step 210 of the processing routine in FIG. 11.

Then, the timing of the edges (the rise and the fall) of the control signals B1U, B1L, B2U, B2L in the next cycle of the carrier waves Ca1, Ca2 are set as the target timing T11 to T13 (T11<T12<T13) in the cycle (step S420), and the combination of the control signals S1a to S4a for the switches S1 to S4 is set for each of the target timing T11 to T13 (step S430). These of the processing can be executed in a similar manner to the processing in steps S310, S320 of the processing routine in FIG. 16. As described above, and, as it is understood from FIG. 7, in the next cycle of the carrier waves Ca1, Ca2, the control signals B1U, B1L for the upper and lower arms of the first power supply converter are switched between ON and OFF at the time (Tw+τd1) and the time (Tw+τw), and the control signals B2U, B2L for the upper and lower arms of the second power supply converter are switched between ON and OFF at the time (Tw+τw−τd2) and the time (Tw+τw). Then, some of the control signals S1x to S4x for the switches S1 to S4 are switched between ON and OFF at each of the three of the time (the timing) that are the time (Tw+τd1), the time (Tw+τw−τd2), and the time (Tw+τw). Thus, in consideration of relationships between the timing of the edges of the control signals B1U, B1L, B2U, B2L and the timing of the edges of the control signals S1x to S4x, it is considered that the waveforms of the control signals S1a to S4a can conform to the waveforms of the control signals S1x to S4x in the comparative example by executing the processing in steps S420, S430 in the similar manner to the processing in steps S310, S320 of the processing routine in FIG. 16.

Then, the target timing T11 to T13 and the combination of the control signals S1a to S4a for the switches S1 to S4 at each of the target timing T11 to T13 in the next cycle of the carrier waves Ca1, Ca2 are set in the matching output section (step S440), and this routine is terminated. This processing can be executed in a similar manner to the processing in step S330 of the processing routine in FIG. 16.

By adopting the method as described above, similar to the second embodiment, the switching control of the switches S1 to S4 can be executed without providing the logic circuit and sequentially performing the logical operations that correspond to the processing in the logic circuit.

In the power supply apparatus 120 of the second embodiment, the sawtooth wave is used as the carrier wave Ca1, and the reverse-sawtooth wave is used as the carrier wave Ca2. However, the reverse-sawtooth wave may be used as the carrier wave Ca1, and the sawtooth wave may be used as the carrier wave Ca2. Alternatively, the sawtooth waves may be used as the carrier waves Ca1, Ca2, or the reverse-sawtooth waves may be used as the carrier waves Ca1, Ca2. FIG. 21 is an explanatory table that shows the target timing T11 to T13 in the next cycle of the carrier waves Ca1, Ca2 and the combination of the control signals S1a to S4a for the switches S1 to S4 at each of the target timing T11 to T13 in the case where the reverse-sawtooth wave is used as the carrier wave Ca1 and the sawtooth wave is used as the carrier wave Ca2. FIG. 22 is an explanatory table that shows the target timing T11 to T13 in the next cycle of the carrier waves Ca1, Ca2 and the combination of the control signals S1a to S4a for the switches S1 to S4 at each of the target timing T11 to T13 in the case where the sawtooth waves are used as the carrier waves Ca1, Ca2. FIG. 23 is an explanatory table that shows the target timing T11 to T13 in the next cycle of the carrier waves Ca1, Ca2 and the combination of the control signals S1a to S4a for the switches S1 to S4 at each of the target timing T11 to T13 in the case where the reverse-sawtooth waves are used as the carrier waves Ca1, Ca2. Hereinafter, a description thereon will sequentially be made.

In FIG. 21, in the case where the sum of the target duty ratio Du1* and the target duty ratio Du2* is smaller than the value 1, the time (Tw+τd2), (Tw+τw−τd1), (Tw+τw) are respectively set as the target timing T11 to T13. In addition, for the target timing T11, (1, 1, 0, 1) is set as the combination of the control signals S1a, S2a, S3a, S4a. For the target timing T12, (1, 0, 1, 1) is set as the combination of the control signals S1a, S2a, S3a, S4a. For the target timing 13, (1, 1, 1, 0) is set as the combination of the control signals S1a, S2a, S3a, S4a.

In addition, in FIG. 21, in the case where the sum of the target duty ratio Du1* and the target duty ratio Du2* is larger than the value 1, the time (Tw+τw−τd1), (Tw+τd2), (Tw+τw) are respectively set as the target timing T11 to T13. In addition, for the target timing T11, (0, 1, 1, 1) is set as the combination of the control signals S1a, S2a, S3a, S4a. For the target timing T12, (1, 0, 1, 1) is set as the combination of the control signals S1a, S2a, S3a, S4a. For the target timing T13, (1, 1, 1, 0) is set as the combination of the control signals S1a, S2a, S3a, S4a.

Furthermore, in FIG. 21, in the case where the sum of the target duty ratio Du1* and the target duty ratio Du2* is equal to the value 1, the time (Tw+τd2)=(Tw+τw−τd1), (Tw+τw) are respectively set as the target timing T11=T12, T13. In addition, for the target timing T11, T12, (1, 0, 1, 1) is set as the combination of the control signals S1a, S2a, S3a, S4a. For the target timing T13, (1, 1, 1, 0) is set as the combination of the control signals S1a, S2a, S3a, S4a.

In FIG. 22, in the case where the target duty ratio Du1* is smaller than the target duty ratio Du2*, the time (Tw+τd1), (Tw+τd2), (Tw+τw) are respectively set as the target timing T11 to T13. In addition, for the target timing T11, (1, 1, 1, 0) is set as the combination of the control signals S1a, S2a, S3a, S4a. For the target timing T12, (1, 1, 0, 1) is set as the combination of the control signals S1a, S2a, S3a, S4a. For the target timing T13, (0, 1, 1, 1) is set as the combination of the control signals S1a, S2a, S3a. S4a.

In addition, in FIG. 22, in the case where the target duty ratio Du1* is larger than the target duty ratio Du2*, the time (Tw+τd2), (Tw+τd1), (Tw+τw) are respectively set as the target timing T11 to T13. In addition, for the target timing T11, (1, 0, 1, 1) is set as the combination of the control signals S1a, S2a, S3a, S4a. For the target timing T12, (1, 1, 0, 1) is set as the combination of the control signals S1a, S2a, S3a, S4a. For the target timing T13, (0, 1, 1, 1) is set as the combination of the control signals S1a, S2a, S3a, S4a.

Furthermore, in FIG. 22, in the case where the target duty ratio Du1* is equal to the target duty ratio Du2*, the time (Tw+τd1)=(Tw+τd2), (Tw+τw) are respectively set as the target timing T11=T12, T13. In addition, for the target timing T11, T12, (1, 1, 0, 1) is set as the combination of the control signals S1a, S2a, S3a, S4a. For the target timing T13, (0, 1, 1, 1) is set as the combination of the control signals S1a, S2a, S3a, S4a.

In FIG. 23, in the case where the target duty ratio Du1* is smaller than the target duty ratio Du2*, the time (Tw+τw−τd2), (Tw+τw−τd1), (Tw+Tw) are respectively set as the target timing T11 to T13. In addition, for the target timing T11, (1, 1, 1, 0) is set as the combination of the control signals S1a, S2a, S3a, S4a. For the target timing T12, (0, 1, 1, 1) is set as the combination of the control signals S1a, S2a, S3a, S4a. For the target timing T13, (1, 1, 0, 1) is set as the combination of the control signals S1a, S2a, S3a, S4a.

In addition, in FIG. 23, in the case where the target duty ratio Du1* is larger than the target duty ratio Du2*, the time (Tw+τw−τd1), (Tw+τw−τd2), (Tw+τw) are respectively set as the target timing T11 to T13. In addition, for the target timing T11, (1, 0, 1, 1) is set as the combination of the control signals S1a, S2a, S3a. S4a. For the target timing T12, (0, 1, 1, 1) is set as the combination of the control signals S1a, S2a, S3a, S4a. For the target timing T13, (1, 1, 0, 1) is set as the combination of the control signals S1a, S2a, S3a, S4a.

Furthermore, in FIG. 23, in the case where the target duty ratio Du1* is equal to the target duty ratio Du2*, the time (Tw+τw−τd2)=(Tw+τw−τd1), (Tw+τw) are respectively set as the target timing T11=T12, T13. In addition, for the target timing T11, T12, (0, 1, 1, 1) is set as the combination of the control signals S1a, S2a, S3a, S4a. For the target timing T13, (1, 1, 0, 1) is set as the combination of the control signals S1a, S2a, S3a, S4a.

As in these descriptions, the target timing T11 to T13 in the next cycle of the carrier waves Ca1, Ca2 and the combination of the control signals S1a to S4a for the switches S1 to S4 at each of the target timing T11 to T13 are set by using FIG. 21 to FIG. 23, respectively, in the case where the reverse-sawtooth wave is used as the carrier wave Ca1 and the sawtooth wave is used as the carrier wave Ca2, in the case where the sawtooth waves are used as the carrier waves Ca1, Ca2, and in the case where the reverse-sawtooth waves are used as the carrier waves Ca1, Ca2. In this way, similar to the second embodiment, the switching control of the switches S1 to S4 can be executed without providing the logic circuit and sequentially performing the logical operations that correspond to the processing in the logical circuit.

In the power supply apparatus 120 of the second embodiment and the modified example thereof, the sawtooth wave(s) and/or the reverse-sawtooth wave(s) that are in the same cycle and whose reset timing match each other are used as the carrier waves Ca1, Ca2. However, the sawtooth wave(s) and/or the reverse-sawtooth wave(s), whose reset timing differ from each other, may be used as the carrier waves Ca1, Ca2 as long as they are in the same cycle. In this case, the four of the timing in the one cycle of the carrier waves Ca1, Ca2 are set as the target timing, and the combination of the control signals S1a to S4a at each of the target timing only has to be set.

In the power supply apparatus 120 of the second embodiment and the modified example thereof, the sawtooth wave(s) and/or the reverse-sawtooth wave(s) that are in the same cycle are used as the carrier waves Ca1, Ca2. However, the triangle waves that are in the same cycle may be used as the carrier waves Ca1, Ca2. In this case, the four of the timing in the one cycle of the carrier waves Ca1, Ca2 are set as the target timing, and the combination of the control signals S1a to S4a at each of the target timing only has to be set. Noted that the four of the timing are the timing at which the carrier wave Ca1 and the target duty ratio Du1* become equal to each other during the increase and the decrease of the carrier wave Ca1 and the timing at which the carrier wave Ca2 and the target duty ratio Du2* become equal to each other during the increase and the decrease of the carrier wave Ca2.

In each of the power supply apparatuses 20, 120 of the first and second embodiments, the switching control of the switches S1 to S4 in the converter 40 is executed such that the voltage VH of the power line 14 becomes the target voltage VH* thereof by the function as the first power supply converter and that the current IL2 flowing through the reactor L2 becomes the target current IL2* by the function as the second power supply converter. However, the switching control of the switches S1 to S4 in the converter 40 may be executed such that the voltage VH of the power line 14 becomes the target voltage VH* thereof by the function as the second power supply converter and that the current IL1 flowing through the reactor L1 becomes a target current IL1* by the function as the first power supply converter. Here, the target current IL1* of the reactor L1 can be set on the basis of the states of charge SOC1, SOC2 of the batteries 22, 32 and the like.

A description will be made on corresponding relationships between the primary elements of the embodiments and the primary elements of the disclosure that are described in the SUMMARY section. In the embodiments, the battery 22 is an example of the "first power supply", the battery 32 is an example of the "second power supply", the converter 40 that has the switches S1 to S4, the diodes D1 to D4, and the reactors L1, L2 are examples of the "converter", and the electronic control unit 60 is an example of the "control unit".

The control unit (e.g., electronic control unit 60) may be configured to perform disclosed functions. For example, the control unit may be programmed to perform disclosed functions. The control unit may store or retrieve digitized instructions, which the control unit may execute to perform disclosed functions. The digitized instructions may be stored in a non-transitory computer-readable medium. Further, the control unit may include one or more electronic control units to perform disclosed processes.

The description has been made so far on the modes for carrying out the embodiments. However, it is needless to say that the disclosure is not limited to these embodiments in any respect and can be implemented in various modes within a scope that does not depart from the gist of the disclosure.

Disclosed embodiments can be used in a manufacturing industry of the power supply apparatus and the like.

Following is a summary of the disclosed embodiments. In accordance with three of timing that are time (Tw+τd1), (Tw+τw−τd2), (Tw+τw) in a next cycle of carrier waves Ca1, Ca2, an electronic control unit separately sets target timing of each of edges of control signals S1a to S4a for switches S1 to S4 in the cycle. Then, the electronic control unit switches output of the corresponding control signal from OFF to ON or from ON to OFF when a timekeeping value of a timer reaches the target timing of each of the edges of the control signals S1a to S4a.

What is claimed is:

1. A power supply apparatus comprising:
   a first power supply;
   a second power supply;
   a load;
   a first power line to which the first power supply is connected, the first power line having a first positive bus bar and a first negative bus bar;
   a second power line to which the second power supply is connected, the second power line having a second positive bus bar and a second negative bus bar;
   a third power line to which the load is connected, the third power line having a third positive bus bar and a third negative bus bar; and
   a converter connected to the first power line, the second power line, and the third power line, the converter configured to be able to boost and supply first power from the first power line and second power from the second power line to the third power line, the converter including:
      a first switch, a second switch, a third switch, and a fourth switch connected in series between the third positive bus bar and a communication point between the first negative bus bar and the third negative bus bar, a connection point between the third switch and the fourth switch being connected to the second negative bus bar;
      a first diode, a second diode, a third diode, and a fourth diode connected in parallel to the first switch, the second switch, the third switch, and the fourth switch, respectively;
      a first reactor connected to the first positive bus bar and a connection point between the second switch and the third switch;
      a second reactor connected to the second positive bus bar and a connection point between the first switch and the second switch; and
      at least one electronic control unit programmed to:
         control the converter,
         set target timing of switching of each of the first switch, the second switch, the third switch, and the fourth switch,
         output a switching command to each of the first switch, the second switch, the third switch, and the fourth switch in accordance with the target timing, and
         set the target timing in one cycle of a first carrier wave and a second carrier wave in accordance with a plurality of timings that are a reset timing and two timings other than the reset timing in the one cycle of the first carrier wave and the second carrier wave,
         wherein the first carrier wave is a sawtooth wave or a reverse-sawtooth wave and the sawtooth wave is used as the first carrier wave for controlling first power that is supplied from the first power line to the second power line,
         wherein the second carrier wave is the other of the sawtooth wave or the reverse-sawtooth wave, and reset timing of the second carrier wave matches reset timing of the first carrier wave,
         wherein the two timings other than the reset timing include a timing at which the first carrier wave and a first target duty ratio become equal to each other during increase of the first carrier wave and a timing at which the second carrier wave and a second target duty ratio become equal to each other during decrease of the second carrier wave, and
         wherein the reverse-sawtooth wave that is in the same cycle as the first carrier wave and whose reset timing matches that of the first carrier wave is used as the second carrier wave for controlling second power that is supplied from the third power line to the second power line.

2. The power supply apparatus according to claim 1, wherein
   the at least one electronic control unit is programmed to separately set the target timing for each of the first switch, the second switch, the third switch, and the fourth switch, and
   the at least one electronic control unit is programmed to output the switching command to a corresponding switch among the first switch, the second switch, the third switch, and the fourth switch when time reaches each of the set target timing.

3. The power supply apparatus according to claim 2, wherein
   the at least one electronic control unit is programmed to separately set the target timing for each of the first switch, the second switch, the third switch, and the fourth switch based on one of i) and ii), or i) and iii):
   i) the plurality of timings in the one cycle of the first carrier wave and the second carrier wave;
   ii) a magnitude relationship between a sum of the first target duty ratio and the second target duty ratio and a value 1; and
   iii) a magnitude relationship between the first target duty ratio and the second target duty ratio.

4. The power supply apparatus according to claim 3, wherein
   the at least one electronic control unit is programmed to separately set the target timing for each of the first switch, the second switch, the third switch, and the fourth switch based on either i), ii), and iv) or i), iii) and iv):
   iv) whether the first carrier wave is the sawtooth wave or the reverse-sawtooth wave, and whether the second carrier wave is the other of the sawtooth wave or the reverse-sawtooth wave.

5. The power supply apparatus according to claim 2, wherein
   the at least one electronic control unit is programmed to separately set the target timing for each of the first switch, the second switch, the third switch, and the fourth switch in consideration of a dead time that is required for switching of each of the first switch, the second switch, the third switch, and the fourth switch.

6. The power supply apparatus according to claim 1, wherein
   the at least one electronic control unit is programmed to set the plurality of timings in the one cycle of the first carrier wave and the second carrier wave as plurality of the target timing of the first switch, the second switch, the third switch, and the fourth switch in the one cycle of the first carrier wave and the second carrier wave, the at least one electronic control unit is programmed to set a combination of ON-OFF states of the first switch, the second switch, the third switch, and the fourth switch for each of the plurality of timings in the one cycle of the first carrier wave and the second carrier wave, and the at least one electronic control unit is programmed to output the switching command or a keeping command to each of the first switch, the second switch, the third switch, and the fourth switch in accordance with the combination of the ON-OFF states and the ON/OFF states of the first switch, the second switch, the third switch, and the fourth switch when time reaches each of the target timing.

7. The power supply apparatus according to claim 6, wherein
the at least one electronic control unit is programmed to set the combination of the ON-OFF states in accordance with v) or vi):
v) a magnitude relationship between a sum of the first target duty ratio and the second target duty ratio and a value 1; and
vi) a magnitude relationship between the first target duty ratio and the second target duty ratio.

8. The power supply apparatus according to claim 7, wherein
the at least one electronic control unit is programmed to set the combination of the ON-OFF states in accordance with either v) and vii) or vi) and vii):
vii) whether the first carrier wave is the sawtooth wave or the reverse-sawtooth wave, and whether the second carrier wave is the other of the sawtooth wave or the reverse-sawtooth wave.

9. The power supply apparatus according to claim 6, further comprising:
a dead time generation circuit programmed to add a dead time that is required for switching of each of the first switch, the second switch, the third switch, and the fourth switch to output from the electronic control unit, and the dead time generation circuit being programmed to output the output, to which the dead time is added, to the first switch, the second switch, the third switch, and the fourth switch.

10. The power supply apparatus according to claim 1, wherein
the at least one electronic control unit is programmed to generate a first control signal for controlling the first power by using the first target duty ratio and the first carrier wave and generate a second control signal for controlling the second power by using the second target duty ratio and the second carrier wave, and
the at least one electronic control unit is programmed to set rise and fall timing of the first control signal as the first timing and set rise and fall timing of the second control signal as the second timing.

11. The power supply apparatus according to claim 1, further comprising:
a logic circuit including a plurality of OR elements, wherein the target timing of switching of each of the first switch, the second switch, the third switch, and the fourth switch is paired with alternating pairs of the plurality of OR elements.

12. A power supply apparatus comprising:
a first power supply;
a second power supply;
a load;
a first power line to which the first power supply is connected, the first power line having a first positive bus bar and a first negative bus bar;
a second power line to which the second power supply is connected, the second power line having a second positive bus bar and a second negative bus bar;
a third power line to which the load is connected, the third power line having a third positive bus bar and a third negative bus bar; and
a converter connected to the first power line, the second power line, and the third power line, the converter configured to be able to boost and supply first power from the first power line and second power from the second power line to the third power line, the converter including:
a first switch, a second switch, a third switch, and a fourth switch connected in series between the third positive bus bar and a communication point between the first negative bus bar and the third negative bus bar, a connection point between the third switch and the fourth switch being connected to the second negative bus bar;
a first diode, a second diode, a third diode, and a fourth diode connected in parallel to the first switch, the second switch, the third switch, and the fourth switch, respectively;
a first reactor connected to the first positive bus bar and a connection point between the second switch and the third switch;
a second reactor connected to and the second positive bus bar and a connection point between the first switch and the second switch; and
at least one electronic control unit programmed to:
control the converter,
set target timing of each of the first switch, the second switch, the third switch, and the fourth switch in one cycle of a first carrier wave in accordance with first timing of rise and fall in one cycle of a first control signal for controlling the first power,
set the target timing of each of the first switch, the second switch, the third switch, and the fourth switch in one cycle of a second carrier wave in accordance with second timing of rise and fall in one cycle of a second control signal for controlling the second power,
output a switching command to each of the first switch, the second switch, the third switch, and the fourth switch in accordance with each of the target timing, the first carrier wave being a carrier wave for controlling the first power, the second carrier wave being a carrier wave for controlling the second power, and the second carrier wave being in the same cycle as the first carrier wave, and
set the target timing in the one cycle of the first carrier wave and the second carrier wave in accordance with a plurality of timings that are the reset timing and two timings other than the reset timing in the one cycle of the first carrier wave and the second carrier wave,
wherein the first carrier wave is a sawtooth wave or a reverse-sawtooth wave and the sawtooth wave is used as the first carrier wave for controlling first power that is supplied from the first power line to the second power line,
wherein the second carrier wave is the other of the sawtooth wave or the reverse-sawtooth wave, and reset timing of the second carrier wave matches reset timing of the first carrier wave, wherein the two timings other than the reset timing include a timing at which the first carrier wave and a first target duty ratio become equal to each other during increase of the first carrier wave and a timing at which the second carrier wave and a second target duty ratio become equal to each other during decrease of the second carrier wave, and wherein the reverse-sawtooth wave that is in the same cycle as the first carrier wave and whose reset timing matches that of the first carrier wave is used as the second carrier wave for controlling second power that is supplied from the third power line to the second power line.

13. The power supply apparatus according to claim 12, further comprising:

a logic circuit including a plurality of OR elements, wherein the target timing of switching of each of the first switch, the second switch, the third switch, and the fourth switch is paired with alternating pairs of the plurality of OR elements.

* * * * *